US011860567B2

(12) United States Patent
Yamada et al.

(10) Patent No.: US 11,860,567 B2
(45) Date of Patent: Jan. 2, 2024

(54) DRUM CARTRIDGE AND IMAGE FORMING APPARATUS HAVING RESIDUAL TONER CONVEYING PIPE

(71) Applicant: BROTHER KOGYO KABUSHIKI KAISHA, Nagoya (JP)

(72) Inventors: Enao Yamada, Nagoya (JP); Shougo Sato, Seto (JP)

(73) Assignee: BROTHER KOGYO KABUSHIKI KAISHA, Nagoya (JP)

(*) Notice: Subject to any disclaimer, the term of this patent is extended or adjusted under 35 U.S.C. 154(b) by 0 days.

(21) Appl. No.: 18/067,811

(22) Filed: Dec. 19, 2022

(65) Prior Publication Data

US 2023/0124989 A1 Apr. 20, 2023

Related U.S. Application Data

(63) Continuation of application No. 17/689,398, filed on Mar. 8, 2022, now Pat. No. 11,561,499, which is a (Continued)

(30) Foreign Application Priority Data

Jan. 29, 2020 (JP) ................................ 2020-013019

(51) Int. Cl.
*G03G 21/00* (2006.01)
*G03G 21/10* (2006.01)
*G03G 21/18* (2006.01)

(52) U.S. Cl.
CPC ....... *G03G 21/105* (2013.01); *G03G 21/1817* (2013.01); *G03G 21/0064* (2013.01); (Continued)

(58) Field of Classification Search
CPC ...... G03G 21/10; G03G 21/105; G03G 21/12; G03G 21/1817; G03G 2221/1624; (Continued)

(56) References Cited

U.S. PATENT DOCUMENTS 5,128,724 A 7/1992 Hayashi et al.
11,300,920 B2 4/2022 Yamada et al.
(Continued)

FOREIGN PATENT DOCUMENTS

JP 2012-173456 A 9/2012
JP 2015-194652 A 11/2015
JP 2017-146509 A 8/2017

*Primary Examiner* — Robert B Beatty
(74) *Attorney, Agent, or Firm* — Merchant & Gould P.C.

(57) ABSTRACT

A drum cartridge includes: a photosensitive drum rotatable about a drum axis extending in an axis direction; a drum cleaner including a cleaning member cleaning a circumferential surface of the photosensitive drum, and a cleaning housing accommodating transfer residual toner removed from the circumferential surface of the photosensitive drum by the cleaning member; a first drum side plate supporting a first end portion of the photosensitive drum; a second drum side plate located distant from the first drum side plate in the axis direction and supporting a second end portion of the photosensitive drum; a pipe located between the first drum side plate and the second drum side plate in the axis direction and extending in the axis direction; and a conveyor device conveying the transfer residual toner from the cleaning housing to the pipe.

11 Claims, 12 Drawing Sheets

Related U.S. Application Data continuation of application No. 17/153,188, filed on Jan. 20, 2021, now Pat. No. 11,300,920.

(52) U.S. Cl.
CPC ............... *G03G 2221/1624* (2013.01); *G03G 2221/1654* (2013.01); *G03G 2221/1861* (2013.01)

(58) Field of Classification Search
CPC ....... G03G 2221/0052; G03G 15/0886; G03G 2215/0692
USPC .................................................. 399/120, 359
See application file for complete search history.

(56) References Cited

U.S. PATENT DOCUMENTS

| | | | |
|---|---|---|---|
| 2010/0074646 | A1 | 3/2010 | Miyahara et al. |
| 2011/0076056 | A1 | 3/2011 | Sato |
| 2012/0213567 | A1 | 8/2012 | Sato et al. |
| 2015/0261173 | A1 | 9/2015 | Sato |
| 2015/0277344 | A1 | 10/2015 | Tashimoto et al. |
| 2017/0285568 | A1 | 10/2017 | Nishiyama et al. |
| 2018/0373197 | A1 | 12/2018 | Sato et al. |
| 2020/0064773 | A1 | 2/2020 | Sato |

DRUM CARTRIDGE AND IMAGE FORMING APPARATUS HAVING RESIDUAL TONER CONVEYING PIPE

CROSS-REFERENCE TO RELATED APPLICATIONS

This application is a continuation of U.S. patent application Ser. No. 17/689,398, filed Mar. 8, 2022, now U.S. Pat. No. 11,561,499 which is a continuation of U.S. patent application Ser. No. 17/153,188, filed Jan. 20, 2021, now U.S. Pat. No. 11,300,920, which is based on and claims priority under 35 USC 119 from Japanese Patent Application No. 2020-013019 filed on Jan. 29, 2020, the contents of which are incorporated herein by reference.

TECHNICAL FIELD

The present disclosure relates to a drum cartridge and an image forming apparatus.

BACKGROUND

In the related art, a drum cartridge includes a photosensitive drum, a drum cleaner, a first drum side plate, a second drum side plate, a pipe, and a conveyor device. The second drum side plate is located distant from the first drum side plate in an axis direction. The pipe protrudes from the first drum side plate toward the second drum side plate. The conveyor device is configured to convey transfer residual toner from a cleaning housing to the pipe.

SUMMARY

One illustrative aspect of the present disclosure provides a drum cartridge including: a photosensitive drum rotatable about a drum axis extending in an axis direction; a drum cleaner comprising: a cleaning member configured to clean a circumferential surface of the photosensitive drum; and a cleaning housing configured to accommodate transfer residual toner removed from the circumferential surface of the photosensitive drum by the cleaning member; a first drum side plate configured to support a first end portion of the photosensitive drum in the axis direction; a second drum side plate located distant from the first drum side plate in the axis direction and configured to support a second end portion of the photosensitive drum in the axis direction; a pipe located between the first drum side plate and the second drum side plate in the axis direction and extending in the axis direction, a first end portion of the pipe in the axis direction connecting to the first drum side plate, a second end portion of the pipe in the axis direction connecting to the second drum side plate; and a conveyor device configured to convey the transfer residual toner from the cleaning housing to the pipe.

According to the drum cartridge of the present disclosure, the user can easily grip the drum cartridge.

BRIEF DESCRIPTION OF DRAWINGS

Illustrative embodiments of the disclosure will be described in detail based on the following figures, wherein.

DETAILED DESCRIPTION

In the above-explained related art, there is no member that a user can grip between the first drum side plate and the second drum side plate in the drum cartridge.

For this reason, it is difficult for the user to carry the drum cartridge.

Therefore, illustrative aspects of the present disclosure provide a drum cartridge that a user can easily carry, and an image forming apparatus including the drum cartridge.

1. Image Forming Apparatus 1

An outline of an image forming apparatus 1 is described with reference to FIGS. 1 and 2.

Figure 1:
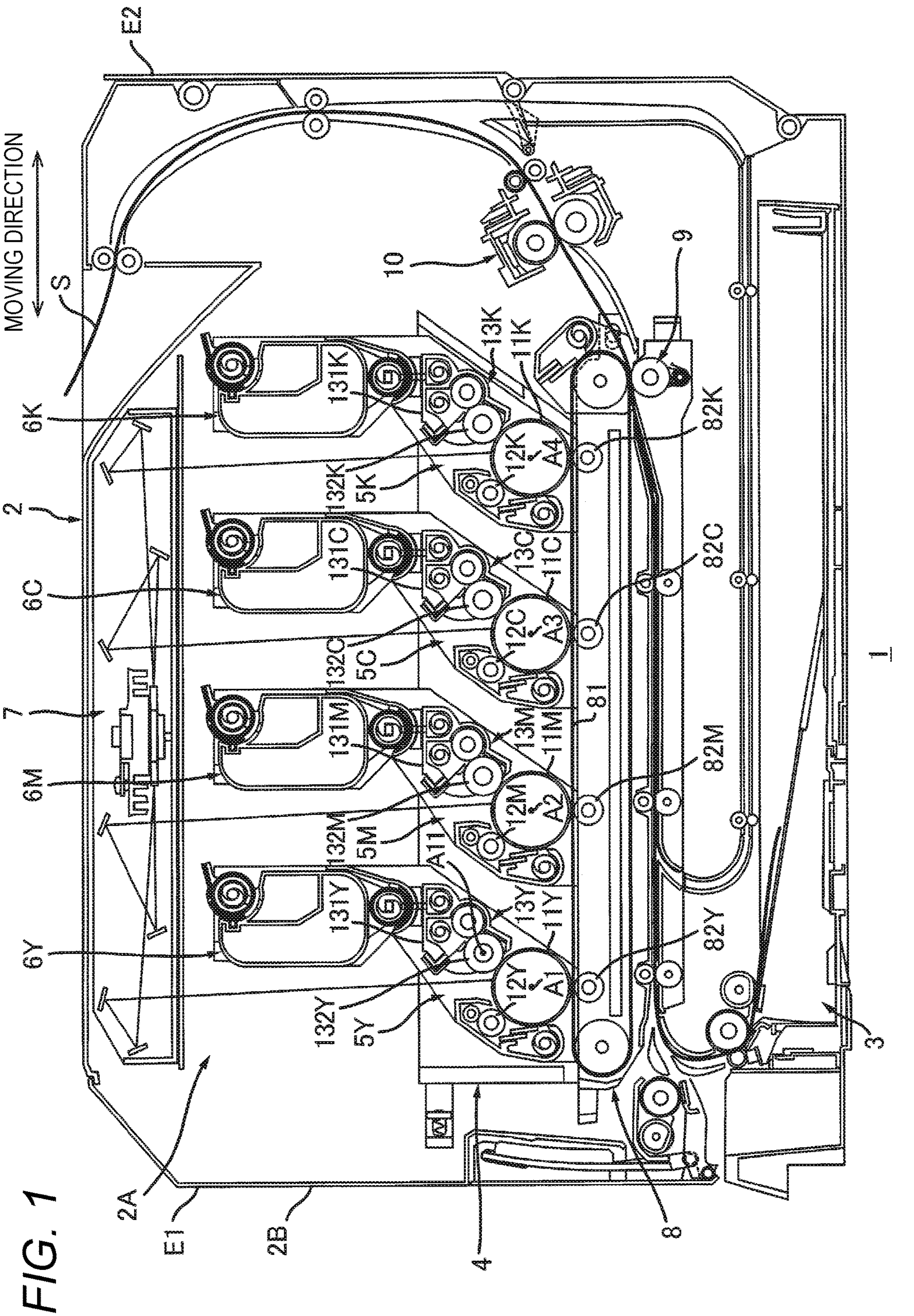
FIG. 1 is a schematic configuration view of an image forming apparatus.

As shown in FIG. 1, the image forming apparatus 1 includes a main body housing 2, a sheet cassette 3, a drawer 4, four drum cartridges 5Y, 5M, 5C and 5K, four toner cartridges 6Y, 6M, 6C and 6K, an exposure device 7, a belt unit 8, a transfer roller 9, and a fixing device 10.

1.1 Main Body Housing 2

In the main body housing 2, the sheet cassette 3, the drawer 4, the four drum cartridges 5Y, 5M, 5C and 5K, the four toner cartridges 6Y, 6M, 6C and 6K, the exposure device 7, the belt unit 8, the transfer roller 9, and the fixing device 10 are accommodated.

Figure 2:
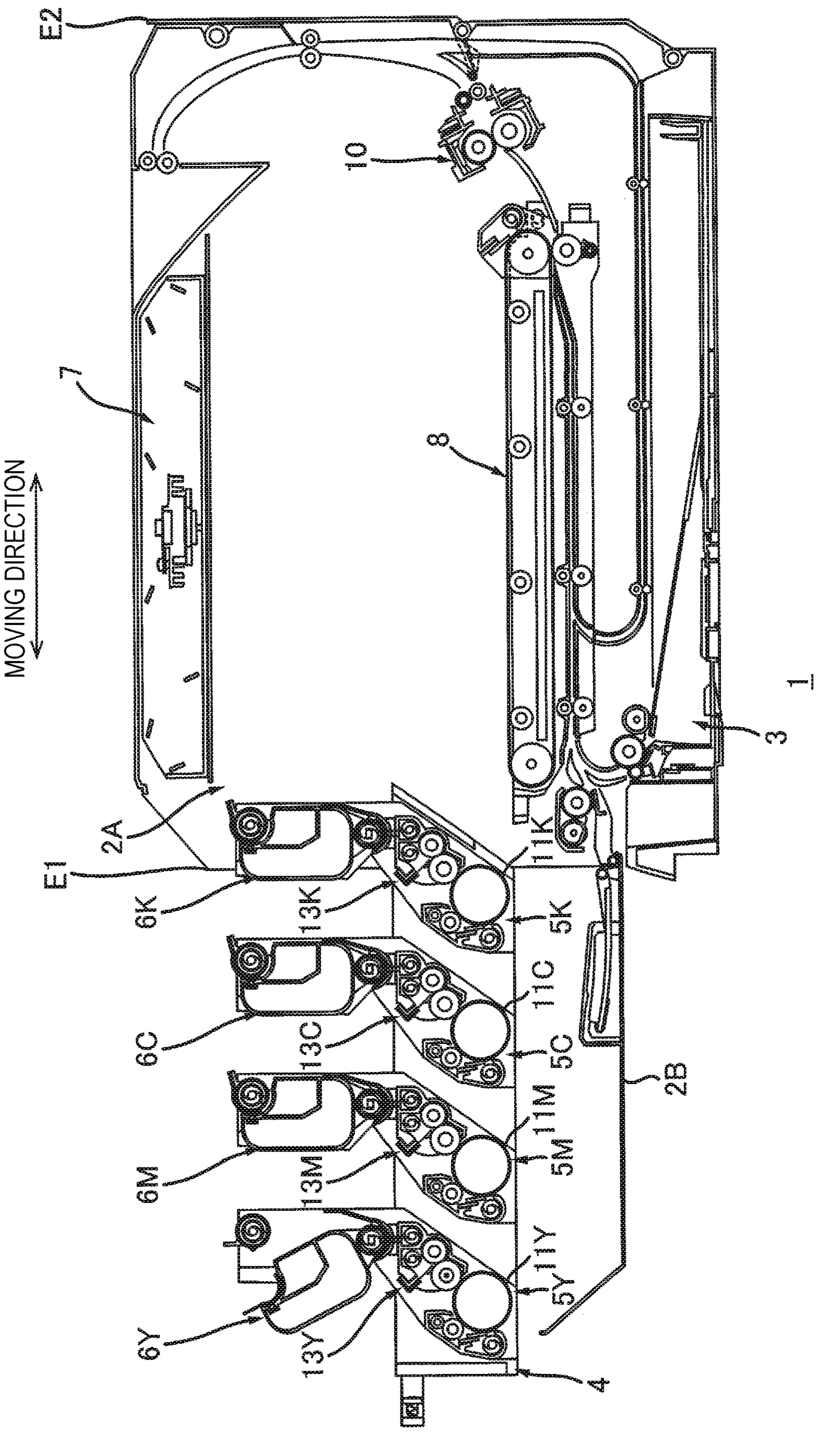
FIG. 2 illustrates movement of a drawer shown in FIG. 1, depicting a state where a cover is located in a cover-opened position and the drawer is located in an outer position.

As shown in FIG. 2, the main body housing 2 has a first end portion E1, and a second end portion E2 in a moving direction of the drawer 4. The second end portion E2 is located distant from the first end portion E1 in the moving direction of the drawer 4.

The main body housing 2 has an opening 2A. The main body housing 2 includes a cover 2B.

The opening 2A is located at the first end portion E1 of the main body housing 2. In other words, the first end portion E1 has the opening 2A.

The cover 2B can move between a cover-closed position (refer to FIG. 1) and a cover-opened position (refer to FIG. 2). When the cover 2B is located in the cover-closed position, the cover 2B closes the opening 2A. When the cover 2B is located in the cover-opened position, the opening 2A is opened.

1.2 Sheet Cassette 3

As shown in FIG. 1, the sheet cassette 3 can accommodate sheets S. The sheet S in the sheet cassette 3 is conveyed toward the transfer roller 9.

1.3 Drawer 4

As shown in FIGS. 1 and 2, in a state where the cover 2B is located in the cover-opened position, the drawer 4 can move in the moving direction between an inner position (refer to FIG. 1) and an outer position (refer to FIG. 2) through the opening 2A. As shown in FIG. 1, in a state where the drawer 4 is located in the inner position, the drawer 4 is entirely located inside of the main body housing 2. As shown in FIG. 2, in a state where the drawer 4 is located in the outer position, at least a part of the drawer 4 is located outside of the main body housing 2.

1.4 Drum Cartridge 5Y

The drum cartridge 5Y can be mounted to the drawer 4. Specifically, in the state where the drawer 4 is located in the outer position, the drum cartridge 5Y can be mounted to the drawer 4. In a state where the drum cartridge 5Y is mounted to the drawer 4, the drawer 4 supports the drum cartridge 5Y. The drum cartridge 5Y mounted to the drawer 4 can be removed from the drawer 4 in the state where the drawer 4 is located in the outer position. As shown in FIG. 1, the drum cartridge 5Y includes a photosensitive drum 11Y, a charging device 12Y, and a developing device 13Y.

1.4.1 Photosensitive Drum 11Y

The photosensitive drum 11Y extends in an axis direction. In the state where the drum cartridge 5Y is mounted to the drawer 4, the axis direction intersects with the moving direction of the drawer 4. Preferably, in the state where the drum cartridge 5Y is mounted to the drawer 4, the axis direction is orthogonal to the moving direction of the drawer 4. The photosensitive drum 11Y has a cylindrical shape. The photosensitive drum 11Y can rotate about a drum axis A1. The drum axis A1 extends in the axis direction.

1.4.2 Charging Device 12Y

The charging device 12Y is configured to charge a circumferential surface of the photosensitive drum 11Y. In the present illustrative embodiment, the charging device 12Y is a charging roller. The charging device 12Y may also be a scorotron-type charger.

1.4.3 Developing Device 13Y

The developing device 13Y can supply toner to the photosensitive drum 11Y. Specifically, the developing device 13Y includes a developing housing 131Y, and a developing roller 132Y.

1.4.3.1 Developing Housing 131Y

The developing housing 131Y can accommodate the toner supplied from the toner cartridge 6Y. The developing housing 131Y has a developing opening 133 (refer to FIG. 9). The toner supplied from the toner cartridge 6Y enters the developing housing 131Y through the developing opening 133. The developing housing 131Y is configured to support the developing roller 132Y.

1.4.3.2 Developing Roller 132Y

The developing roller 132Y can supply the toner in the developing housing 131Y to the photosensitive drum 11Y. The developing roller 132Y is in contact with the photosensitive drum 11Y. Note that, the developing roller 132Y may be configured to be separable from the photosensitive drum 11Y. The developing roller 132Y extends in the axis direction. The developing roller 132Y can rotate about a developing axis A11. The developing axis A11 extends in the axis direction in the state where the drum cartridge 5Y is mounted to the drawer 4.

1.5 Drum Cartridges 5M, 5C and 5K

Each of the drum cartridges 5M, 5C and 5K is described in a similar manner to the drum cartridge 5Y.

Specifically, each of the drum cartridges 5M, 5C and 5K can be mounted to the drawer 4. In a state where the drum cartridges 5M, 5C and 5K are mounted to the drawer 4, the drawer 4 supports the drum cartridges 5M, 5C and 5K. Each of the drum cartridges 5M, 5C and 5K mounted to the drawer 4 can be removed from the drawer 4. Each of the drum cartridges 5M, 5C and 5K is in alignment with the drum cartridge 5Y in the moving direction of the drawer 4.

The drum cartridge 5M includes a photosensitive drum 11M, a charging device 12M, and a developing device 13M. The photosensitive drum 11M can rotate about a drum axis A2. The drum axis A2 extends in the axis direction. The charging device 12M is configured to charge a circumferential surface of the photosensitive drum 11M. The developing device 13M can supply the toner to the photosensitive drum 11M. The developing device 13M includes a developing housing 131M.

The drum cartridge 5C includes a photosensitive drum 11C, a charging device 12C, and a developing device 13C. The photosensitive drum 11C can rotate about a drum axis A3. The drum axis A3 extends in the axis direction. The charging device 12C is configured to charge a circumferential surface of the photosensitive drum 11C. The developing device 13C can supply the toner to the photosensitive drum 11C. The developing device 13C includes a developing housing 131C and a developing roller 132C.

The drum cartridge 5K includes a photosensitive drum 11K, a charging device 12K, and a developing device 13K. The photosensitive drum 11K can rotate about a drum axis A4. The drum axis A4 extends in the axis direction. The charging device 12K is configured to charge a circumferential surface of the photosensitive drum 11K. The developing device 13K can supply the toner to the photosensitive drum 11K. The developing device 13K includes a developing housing 131K and a developing roller 132K.

1.6 Toner Cartridges 6Y, 6M, 6C and 6K

Each of the toner cartridges 6Y, 6M, 6C and 6K is configured to accommodate the toner.

As shown in FIG. 2, the toner cartridge 6Y can be mounted to the drum cartridge 5Y. In a state where the toner cartridge 6Y is mounted to the drum cartridge 5Y, the drum cartridge 5Y supports the toner cartridge 6Y. The toner cartridge 6Y mounted to the drum cartridge 5Y can be removed from the drum cartridge 5Y. In the state where the toner cartridge 6Y is mounted to the drum cartridge 5Y, the toner cartridge 6Y can supply the toner to the developing device 13Y.

The toner cartridge 6M can be mounted to the drum cartridge 5M. In a state where the toner cartridge 6M is mounted to the drum cartridge 5M, the drum cartridge 5M supports the toner cartridge 6M. The toner cartridge 6M mounted to the drum cartridge 5M can be removed from the drum cartridge 5M. In the state where the toner cartridge 6M is mounted to the drum cartridge 5M, the toner cartridge 6M can supply the toner to the developing device 13M.

The toner cartridge 6C can be mounted to the drum cartridge 5C. In a state where the toner cartridge 6C is mounted to the drum cartridge 5C, the drum cartridge 5C supports the toner cartridge 6C. The toner cartridge 6C mounted to the drum cartridge 5C can be removed from the drum cartridge 5C. In the state where the toner cartridge 6C is mounted to the drum cartridge 5C, the toner cartridge 6C can supply the toner to the developing device 13C.

The toner cartridge 6K can be mounted to the drum cartridge 5K. In a state where the toner cartridge 6K is mounted to the drum cartridge 5K, the drum cartridge 5K supports the toner cartridge 6K. The toner cartridge 6K mounted to the drum cartridge 5K can be removed from the drum cartridge 5K. In the state where the toner cartridge 6K is mounted to the drum cartridge 5K, the toner cartridge 6K can supply the toner to the developing device 13K.

1.7 Exposure Device 7

As shown in FIG. 1, in a state where the drum cartridges 5Y, 5M, 5C and 5K are mounted to the drawer 4 and the drawer 4 is located in the inner position, the exposure device 7 can expose the circumferential surfaces of the photosensitive drums 11Y, 11M, 11C and 11K. In the present illustrative embodiment, the exposure device 7 is a laser scan unit.

1.8 Belt Unit 8

In the state where the drum cartridges 5Y, 5M, 5C and 5K are mounted to the drawer 4 and the drawer 4 is located in the inner position, the belt unit 8 is located below the drum cartridges 5Y, 5M, 5C and 5K. The belt unit 8 includes an intermediate transfer belt 81, and transfer rollers 82Y, 82M, 82C and 82K.

In the state where the drum cartridges 5Y, 5M, 5C and 5K are mounted to the drawer 4 and the drawer 4 is located in the inner position, the intermediate transfer belt 81 is in contact with the photosensitive drums 11Y, 11M, 11C and 11K.

The transfer roller 82Y is configured to transfer the toner on the photosensitive drum 11Y to the intermediate transfer belt 81. The transfer roller 82M is configured to transfer the toner on the photosensitive drum 11M to the intermediate transfer belt 81. The transfer roller 82C is configured to transfer the toner on the photosensitive drum 11C to the intermediate transfer belt 81. The transfer roller 82K is configured to transfer the toner on the photosensitive drum 11K to the intermediate transfer belt 81.

1.9 Transfer Roller 9

The transfer roller 9 is configured to transfer the toner on the intermediate transfer belt 81 to the sheet S. Specifically, the sheet S conveyed from the sheet cassette 3 toward the transfer roller 9 passes between the transfer roller 8 and the intermediate transfer belt 81 and is then conveyed to the fixing device 10. At this time, the transfer roller 9 is configured to transfer the toner on the intermediate transfer belt 81 to the sheet S.

1.10 Fixing Device 10

The fixing device 10 is configured to heat and pressurize the sheet S having the toner transferred thereon, thereby fixing the toner on the sheet S. The sheet S that passes through the fixing device 10 is discharged onto an upper surface of the main body housing 2.

2. Details of Drum Cartridge 5Y

Subsequently, the drum cartridge 5Y is described in detail with reference to FIGS. 3 to 9. Note that, the drum cartridges 5M, 5C and 5K are described in a similar manner to the drum cartridge 5Y. For this reason, the descriptions of the drum cartridges 5M, 5C and 5K are omitted.

Figure 3:
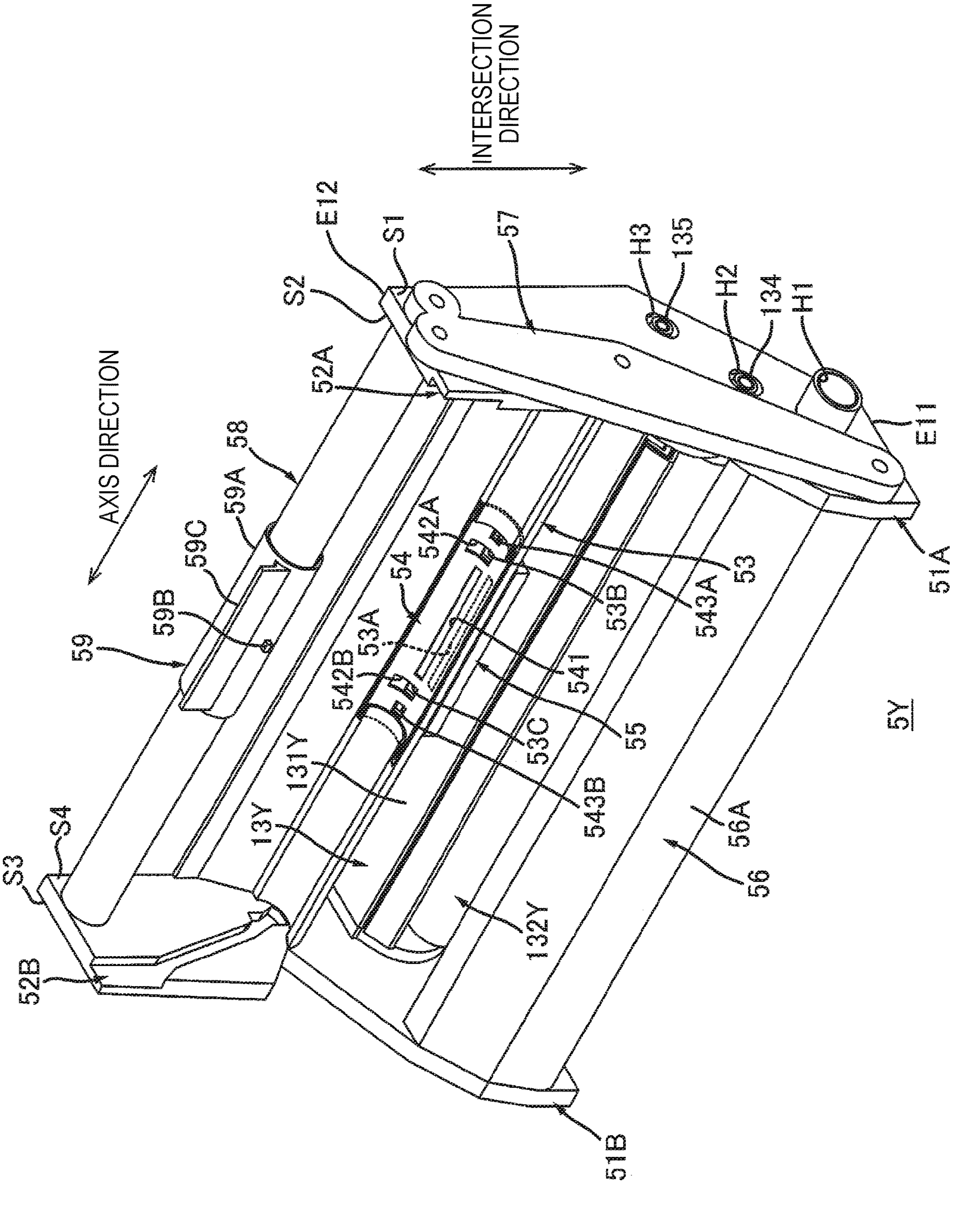
FIG. 3 is a perspective view of a drum cartridge, depicting a state where a shutter is located in a closed position.

As shown in FIG. 3, the drum cartridge 5Y has a first end portion E11, and a second end portion E12 in an intersection direction of intersecting with the axis direction. Note that, the intersection direction intersects with the axis direction. Preferably, the intersection direction is orthogonal to the axis direction. In the state where the drum cartridge 5Y is mounted to the drawer 4, the intersection direction also intersects with the moving direction of the drawer 4. Preferably, in the state where the drum cartridge 5Y is mounted to the drawer 4, the intersection direction is orthogonal to the moving direction of the drawer 4. The photosensitive drum 11Y is located at the first end portion E11. The second end portion E12 is located distant from the first end portion E11 in the intersection direction.

The drum cartridge 5Y includes drum side plates 51A and 51B, toner guides 52A and 52B, a receiving part 53, a shutter 54, a seal member 55, a drum cleaner 56, a conveyor device 57, a pipe 58, and a lock member 59, in addition to the photosensitive drum 11Y, the charging device 12Y and the developing device 13Y.

2.1 Drum Side Plate 51A

The drum side plate 51A is located at one end portion of the drum cartridge 5Y in the axis direction. The drum side plate 51A extends in the intersection direction. The drum side plate 51A has a surface S1 and a surface S2 in the axis direction. The surface S2 is located between the surface S1 and the drum side plate 51B in the axis direction. The drum side plate 51A has a hole H1, a hole H2, and a hole H3.

The hole H1 is located at the first end portion E11 of the drum cartridge 5Y. In the hole H1, one end portion of the photosensitive drum 11Y in the axis direction is rotatably fitted. Thereby, the drum side plate 51A supports one end portion of the photosensitive drum 11Y in the axis direction. The hole H1 has a circular shape.

Figure 4:
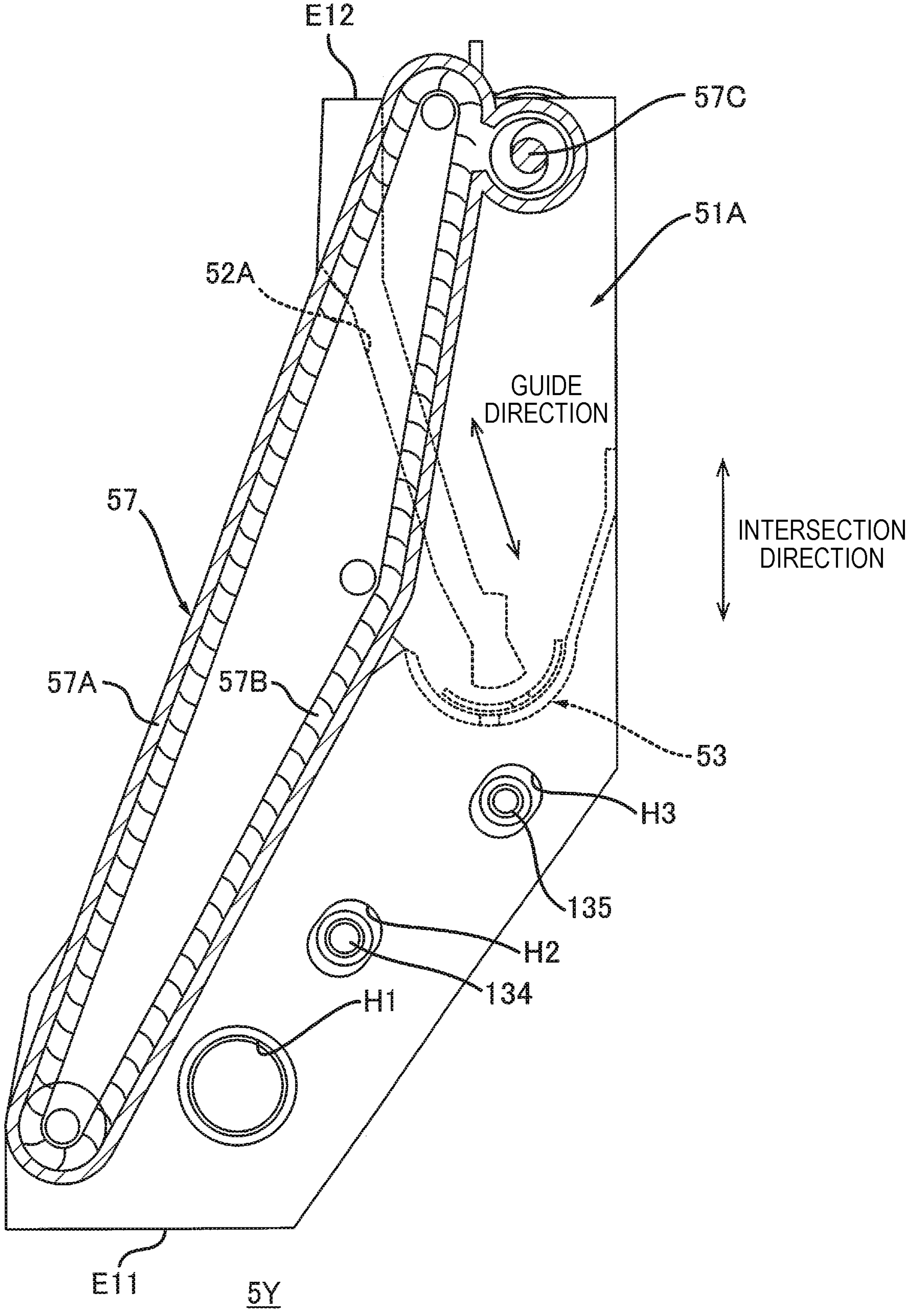
FIG. 4 is a sectional view of the drum cartridge shown in FIG. 3 passing through a conveyor device.

As shown in FIG. 4, the hole H2 is located distant from the hole H1. The hole H2 is located between the hole H1 and the receiving part 53 in the intersection direction. The hole H2 is a long hole. In the hole H2, a projection 134 of the developing device 13Y is fitted. In a state where the projection 134 is fitted in the hole H2, the projection 134 can move with respect to the drum side plate 51A in an extension direction of the hole H2. Note that, the projection 134 is located at one end portion of the developing housing 131Y (refer to FIG. 3) in the axis direction. The projection 134 extends in the axis direction. The projection 134 has a circular column shape. The projection 134 may also be a shaft of the developing roller 132Y (refer to FIG. 3).

The hole H3 is located distant from the hole H2. The hole H3 is located between the hole H2 and the receiving part 53 in the intersection direction. The hole H3 is a long hole. The hole H3 extends in the same direction as the hole H2. In the hole H3, a projection 135 of the developing device 13Y is fitted. In a state where the projection 135 is fitted in the hole H3, the projection 135 can move with respect to the drum side plate 51A in an extension direction of the hole H3. Note that, the projection 135 is located at one end portion of the developing housing 131Y (refer to FIG. 3) in the axis direction. The projection 135 extends in the axis direction. The projection 135 has a circular column shape.

The projection 134 is fitted in the hole H2 and the projection 135 is fitted in the hole H3, so that the drum side plate 51A supports one end portion of the developing device 13Y in the axis direction. In the state where the projection 134 is fitted in the hole H2 and the projection 135 is fitted in the hole H3, the developing device 13Y can move with respect to the drum side plate 51A in the extension direction of the hole H2 and the hole H3.

2.2 Drum Side Plate 51B

As shown in FIG. 3, the drum side plate 51B is located at the other end portion of the drum cartridge 5Y in the axis direction. The drum side plate 51B is located distant from the drum side plate 51A in the axis direction. The drum side plate 51B has a surface S3 and a surface S4 in the axis direction. The surface S4 is located between the surface S3 and the drum side plate 51A in the axis direction.

The drum side plate 51B is configured to support the other end portion of the photosensitive drum 11Y in the axis direction. The drum side plate 51B is configured to support the other end portion of the developing device 13Y in the axis direction. The developing device 13Y is located between the drum side plate 51A and the drum side plate 51B in the axis direction. The developing device 13Y is supported so as to be movable with respect to the photosensitive drum 11Y by the drum side plate 51A and the drum side plate 51B.

The drum side plate 51B is described in a similar manner to the drum side plate 51A. For this reason, the descriptions of the drum side plate 51B are omitted.

2.3 Toner Guide 52A

The toner guide 52A is located on the surface S2 of the drum side plate 51A. The drum side plate 51A has the toner guide 52A. The toner guide 52A is located on an opposite side to the developing device 13Y with respect to the receiving part 53 in the intersection direction.

As shown in FIG. 4, the toner guide 52A extends in a guide direction. The guide direction intersects with the axis direction. Specifically, the guide direction intersects with the intersection direction, and is orthogonal to the axis direction. In the state where the toner cartridge 6Y is mounted to the drum cartridge 5Y and the drum cartridge 5Y is mounted to the drawer 4, the guide direction intersects with the moving direction of the drawer 4.

As shown in FIG. 3, the toner guide 52A is a concave groove. When the toner cartridge 6Y is supported to the drum cartridge 5Y, the toner guide 52A guides one end portion of the toner cartridge 6Y in the axis direction. Specifically, when the toner cartridge 6Y is supported to the drum cartridge 5Y, the toner guide 52A guides one end portion of a second accommodation unit 612 (refer to FIG. 10) in the axis direction. The second accommodation unit 612 will be described later. More specifically, when the toner cartridge 6Y is supported to the drum cartridge 5Y, the toner guide 52A guides a projection 62A (refer to FIG. 10) of the toner cartridge 6Y. The projection 62A will be described later.

2.4 Toner Guide 52B

The toner guide 52B is located on the surface S4 of the drum side plate 51B. The drum side plate 51B has the toner guide 52B. The toner guide 52B is described in a similar manner to the toner guide 52A. That is, the toner guide 52A is located on an opposite side to the developing device 13Y with respect to the receiving part 53 in the intersection direction. The toner guide 52A extends in the guide direction. When the toner cartridge 6Y is supported to the drum cartridge 5Y, the toner guide 52B guides the other end portion of the toner cartridge 6Y in the axis direction. Specifically, when the toner cartridge 6Y is supported to the drum cartridge 5Y, the toner guide 52B guides the other end portion of the second accommodation unit 612 (refer to FIG. 10) in the axis direction. More specifically, when the toner cartridge 6Y is supported to the drum cartridge 5Y, the toner guide 52B guides a projection 62B (refer to FIG. 10) of the toner cartridge 6Y. The projection 62B will be described later.

2.5 Receiving Part 53

In the state where the toner cartridge 6Y is supported to the drum cartridge 5Y, the receiving part 53 receives the toner cartridge 6Y. Specifically, in the state where the toner cartridge 6Y is supported to the drum cartridge 5Y, the receiving part 53 receives the second accommodation unit 612 (refer to FIG. 10) of the toner cartridge 6Y. The receiving part 53 extends in the axis direction. One end portion of the receiving part 53 in the axis direction connects to the drum side plate 51A. The other end portion of the receiving part 53 in the axis direction connects to the drum side plate 51B. The receiving part 53 has a semi-cylindrical shape.

The receiving part 53 has a toner receiving hole 53A, and two holes 53B and 53C.

The toner receiving hole 53A is located at a central part of the receiving part 53 in the axis direction. The toner receiving hole 53A communicates with a developing opening 133 (refer to FIG. 6) of the developing housing 131Y.

The hole 53B is located between the toner receiving hole 53A and the drum side plate 51A in the axis direction. The hole 53B is located distant from the toner receiving hole 53A in the axis direction.

The hole 53C is located between the toner receiving hole 53A and the drum side plate 51B in the axis direction. The hole 53C is located on an opposite side to the hole 53B with respect to the toner receiving hole 53A in the axis direction. The hole 53C is located distant from the toner receiving hole 53A in the axis direction.

2.6 Shutter 54

Figure 5:
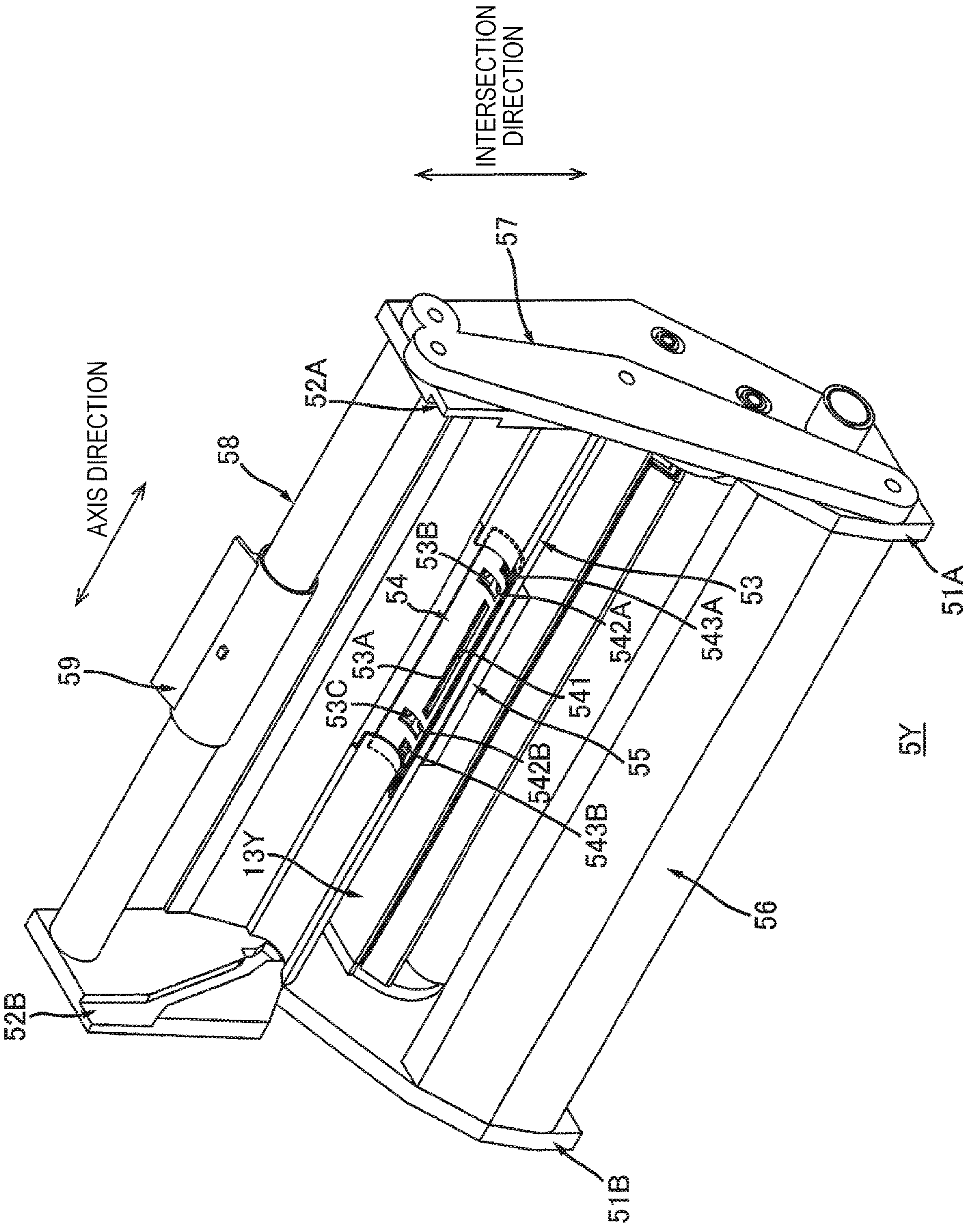
FIG. 5 is a perspective view of the drum cartridge shown in FIG. 3, depicting a state where the shutter is located in an opened position.

The shutter 54 is attached to the receiving part 53. The shutter 54 is configured to close the toner receiving hole 53A. As shown in FIGS. 3 and 5, the shutter 54 can move between a closed position (refer to FIG. 3) and an opened position (refer to FIG. 5). In a state where the shutter 54 is located in the closed position, the shutter 54 closes the toner receiving hole 53A. In a state where the shutter 54 is located in the opened position, the toner receiving hole 53A is opened. The shutter 54 has a through-hole 541, two through-holes 542A and 542B, and two through-holes 543A and 543B.

The through-hole 541 extends in the axis direction. As shown in FIG. 5, in the state where the shutter 54 is located in the opened position, at least a part of the through-hole 541 communicates with the toner receiving hole 53A. Thereby, in the state where the shutter 54 is located in the opened position, the toner receiving hole 53A is opened. On the other hand, as shown in FIG. 3, in the state where the shutter 54 is located in the closed position, the through-hole 541 is located distant from the toner receiving hole 53A.

The through-hole 542A is located between the through-hole 541 and the drum side plate 51A in the axis direction. The through-hole 542A is located distant from the through-hole 541 in the axis direction. The through-hole 542A extends in the moving direction of the shutter 54. As shown in FIGS. 3 and 5, both in the state where the shutter 54 is located in the closed position and in the state where the shutter 54 is located in the opened position, the through-hole 542A communicates with the hole 53B.

As shown in FIG. 3, the through-hole 542B is located between the through-hole 541 and the drum side plate 51B in the axis direction. The through-hole 542B is located on an opposite side to the through-hole 542A with respect to the through-hole 541 in the axis direction. The through-hole 542B is located distant from the through-hole 541 in the axis direction. The through-hole 542B extends in the moving direction of the shutter 54. As shown in FIGS. 3 and 5, both in the state where the shutter 54 is located in the closed position and in the state where the shutter 54 is located in the opened position, the through-hole 542B communicates with the hole 53C.

The through-hole 543A is located between the through-hole 542A and the drum side plate 51A in the axis direction. The through-hole 543A is located on an opposite side to the through-hole 541 with respect to the through-hole 542A in the axis direction.

The through-hole 543B is located between the through-hole 542B and the drum side plate 51B in the axis direction. The through-hole 543B is located on an opposite side to the through-hole 541 with respect to the through-hole 542B in the axis direction.

2.7 Seal Member 55

Figure 6:
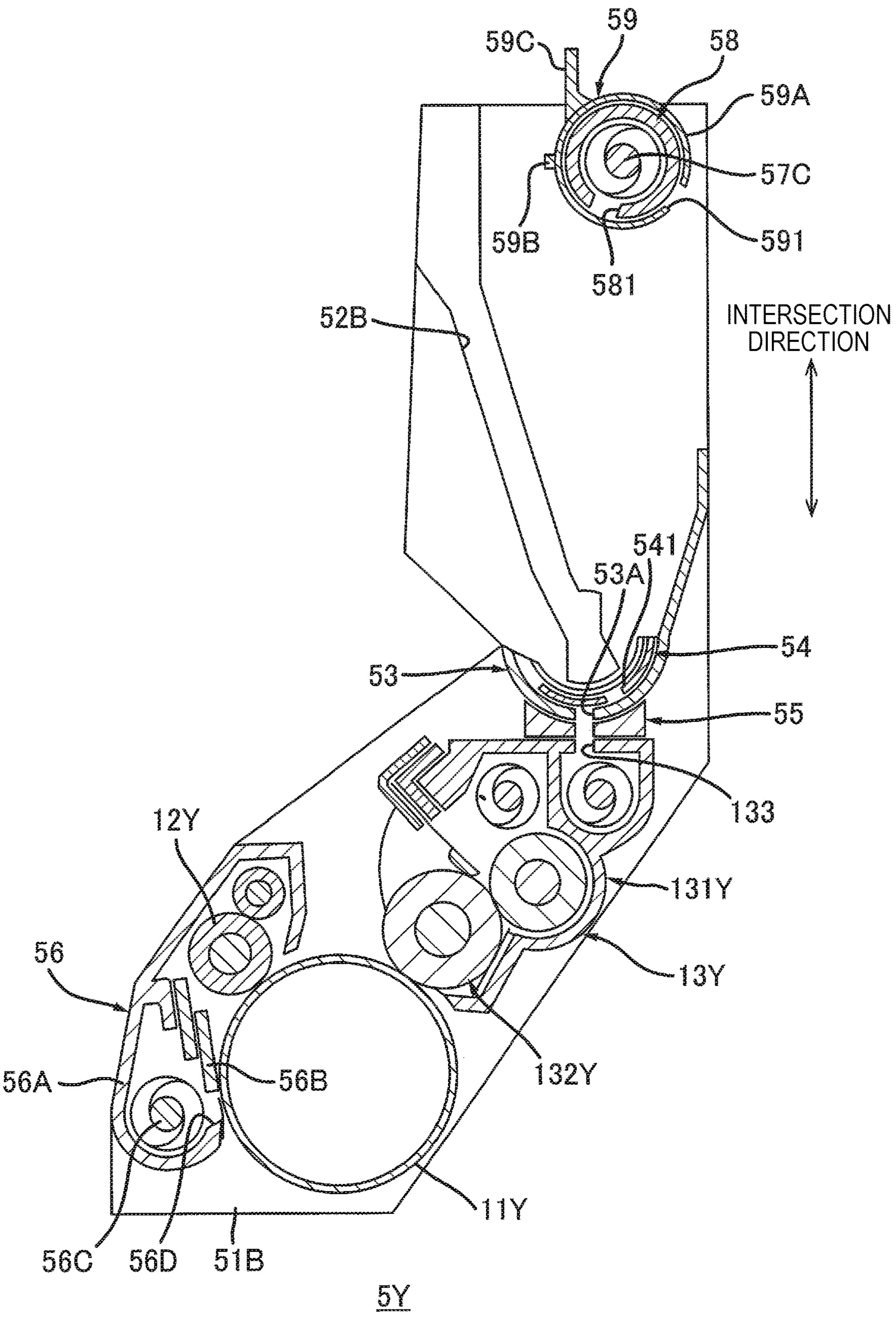
FIG. 6 is a sectional view of the drum cartridge shown in FIG. 3 passing through a toner receiving hole and a transfer residual toner discharge hole.

As shown in FIGS. 3 and 6, the seal member 55 is located between the receiving part 53 and the developing housing 131Y. The seal member 55 is configured to seal the receiving part 53 and the developing housing 131Y therebetween. The seal member 55 surrounds the toner receiving hole 53A and the developing opening 133. The seal member 55 is made of a sponge, for example.

2.8 Drum Cleaner 56

As shown in FIG. 3, the drum cleaner 56 is located at the first end portion E11 of the drum cartridge 5Y. The drum cleaner 56 is located between the drum side plate 51A and the drum side plate 51B in the axis direction. The drum cleaner 56 extends in the axis direction. One end portion of the drum cleaner 56 in the axis direction connects to the drum side plate 51A. The other end portion of the drum cleaner 56 in the axis direction connects to the drum side plate 51B. The drum cleaner 56 is configured to collect transfer residual toner. The transfer residual toner is toner that remains on the surface of the photosensitive drum 11Y without being transferred to the intermediate transfer belt 81.

As shown in FIG. 6, the drum cleaner 56 includes a cleaning housing 56A, a cleaning member 56B, and a screw 56C.

2.8.1 Cleaning Housing 56A

As shown in FIG. 3, the cleaning housing 56A is located between the drum side plate 51A and the drum side plate 51B in the axis direction. The cleaning housing 56A extends in the axis direction. One end portion of the cleaning housing 56A in the axis direction connects to the drum side plate 51A. The other end portion of the cleaning housing 56A in the axis direction connects to the drum side plate 51B.

As shown in FIG. 6, the cleaning housing 56A has an opening 56D. The cleaning housing 56A is configured to accommodate the transfer residual toner.

2.8.2 Cleaning Member 56B

The cleaning member 56B is attached to the cleaning housing 56A. The cleaning member 56B extends in the axis direction. The cleaning member 56B has a plate shape. The cleaning member 56B is configured to clean the circumferential surface of the photosensitive drum 11Y. Specifically, an edge of the cleaning member 56B is in contact with the surface of the photosensitive drum 11Y. When the photosensitive drum 11Y rotates, the transfer residual toner on the surface of the photosensitive drum 11Y is contacted to the edge of the cleaning member 56B and is thus removed from the surface of the photosensitive drum 11Y. In other words, the transfer residual toner is removed from the circumferential surface of the photosensitive drum 11Y by the cleaning member 56B. The removed transfer residual toner is accommodated into the cleaning housing 56A through the opening 56D.

2.8.3 Screw 56C

The screw 56C is located inside of the cleaning housing 56A. The screw 56C extends in the axis direction. The screw 56C is configured to convey the transfer residual toner in the cleaning housing 56A toward the conveyor device 57 (refer to FIG. 3) in the axis direction.

2.9 Conveyor Device 57

As shown in FIG. 3, the conveyor device 57 is attached to the drum side plate 51A. The conveyor device 57 is located on an opposite side to the drum side plate 51B with respect to the drum side plate 51A in the axis direction. The conveyor device 57 extends in the intersection direction. The conveyor device 57 is configured to convey the transfer residual toner from the cleaning housing 56A to the pipe 58. Specifically, as shown in FIG. 4, the conveyor device 57 includes a conveyor housing 57A, a belt conveyor 57B, and a screw 57C.

2.9.1 Conveyor Housing 57A

The conveyor housing 57A is attached to the drum side plate 51A. The conveyor housing 57A is located on an opposite side to the drum side plate 51B (refer to FIG. 3) with respect to the drum side plate 51A in the axis direction. The conveyor housing 57A extends in the intersection direction. In the conveyor housing 57A, the transfer residual toner conveyed by the screw 56C (refer to FIG. 6) of the drum cleaner 56 is accommodated.

2.9.2 Belt Conveyor 57B

The belt conveyor 57B is located inside of the conveyor housing 57A. The belt conveyor 57B is configured to convey the transfer residual toner in the conveyor housing 57A toward the pipe 58 in the intersection direction.

2.9.3 Screw 57C

The screw 57C is located at the second end portion E12 of the drum cartridge 5Y. The screw 57C is configured to convey the transfer residual toner conveyed by the belt conveyor 57B into the pipe 58. The screw 57C extends in the axis direction. One end portion of the screw 57C in the axis direction is located inside of the conveyor housing 57A. The other end portion of the screw 57C in the axis direction is located inside of the pipe 58.

2.10 Pipe 58

As shown in FIG. 3, the pipe 58 is located at the second end portion E12 of the drum cartridge 5Y. The pipe 58 is located distant from the photosensitive drum 11Y in the intersection direction. The pipe 58 is located on an opposite side to the photosensitive drum 11Y with respect to the developing device 13Y in the intersection direction. The pipe 58 is located on an opposite side to the photosensitive drum 11Y with respect to the receiving part 53 in the intersection direction. The pipe 58 is located distant from the receiving part 53 in the intersection direction.

The pipe 58 is located between the drum side plate 51A and the drum side plate 51B in the axis direction. The pipe extends in the axis direction. One end portion of the pipe 58 in the axis direction connects to the drum side plate 51A. The other end portion of the pipe 58 in the axis direction connects to the drum side plate 51B. The pipe 58 has a cylindrical shape. A user can grip the pipe 58 when handling the drum cartridge 5Y. That is, the pipe 58 is a grip.

As shown in FIG. 6, the pipe 58 has a transfer residual toner discharge hole 581. The transfer residual toner discharge hole 581 is located at a central part of the pipe 58 in the axis direction. The transfer residual toner discharge hole 581 can discharge the transfer residual toner. The transfer residual toner conveyed by the conveyor device 57 (refer to FIG. 3) is discharged from the transfer residual toner discharge hole 581 through the pipe 58.

2.11 Lock Member 59

As shown in FIG. 3, the lock member 59 is attached to the pipe 58. The lock member 59 is located at a central part of the pipe 58 in the axis direction.

Figure 7:
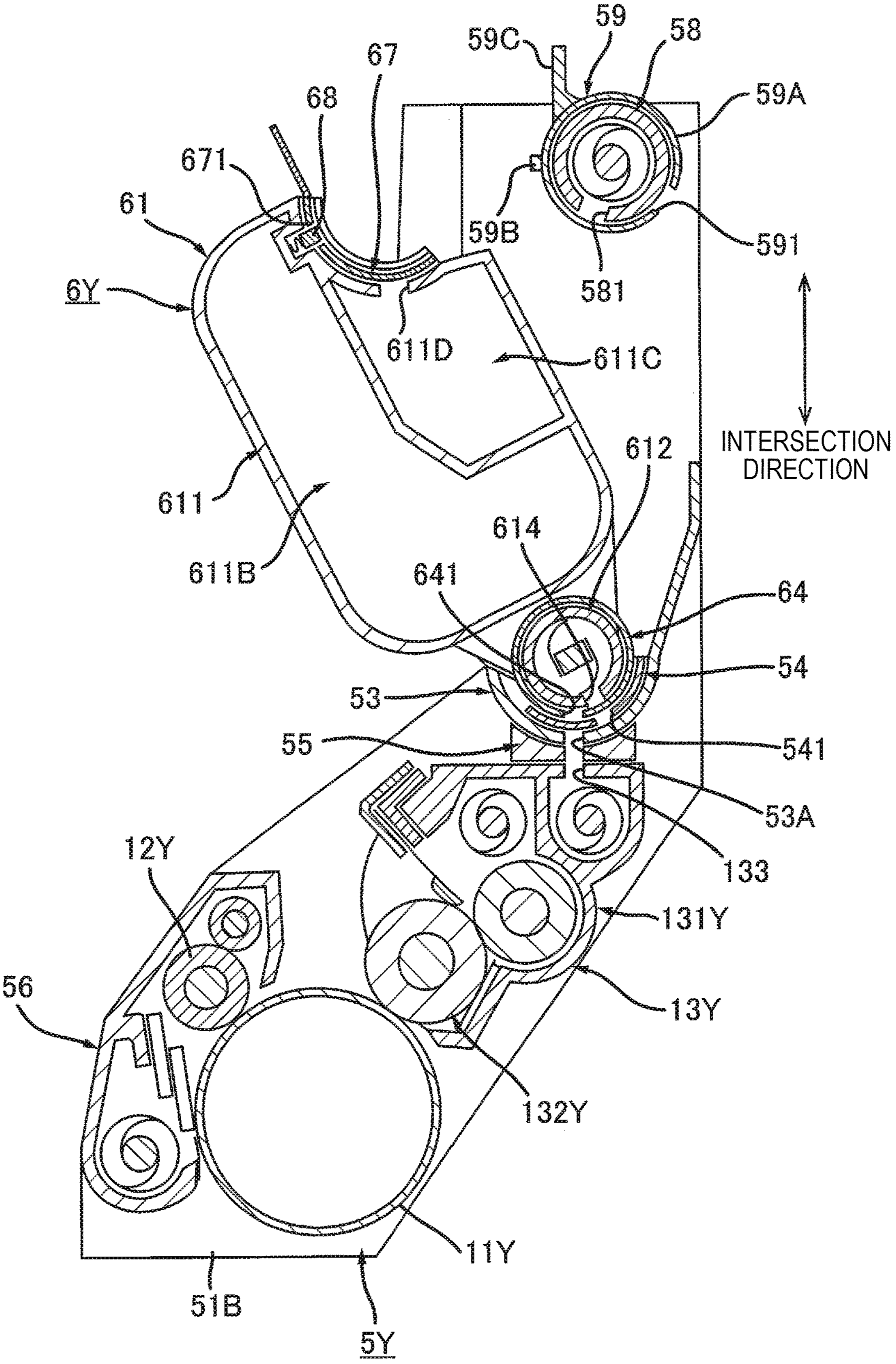
FIG. 7 depicts a state where a toner cartridge is mounted to the drum cartridge and a toner housing is located in a first position.
Figure 8:
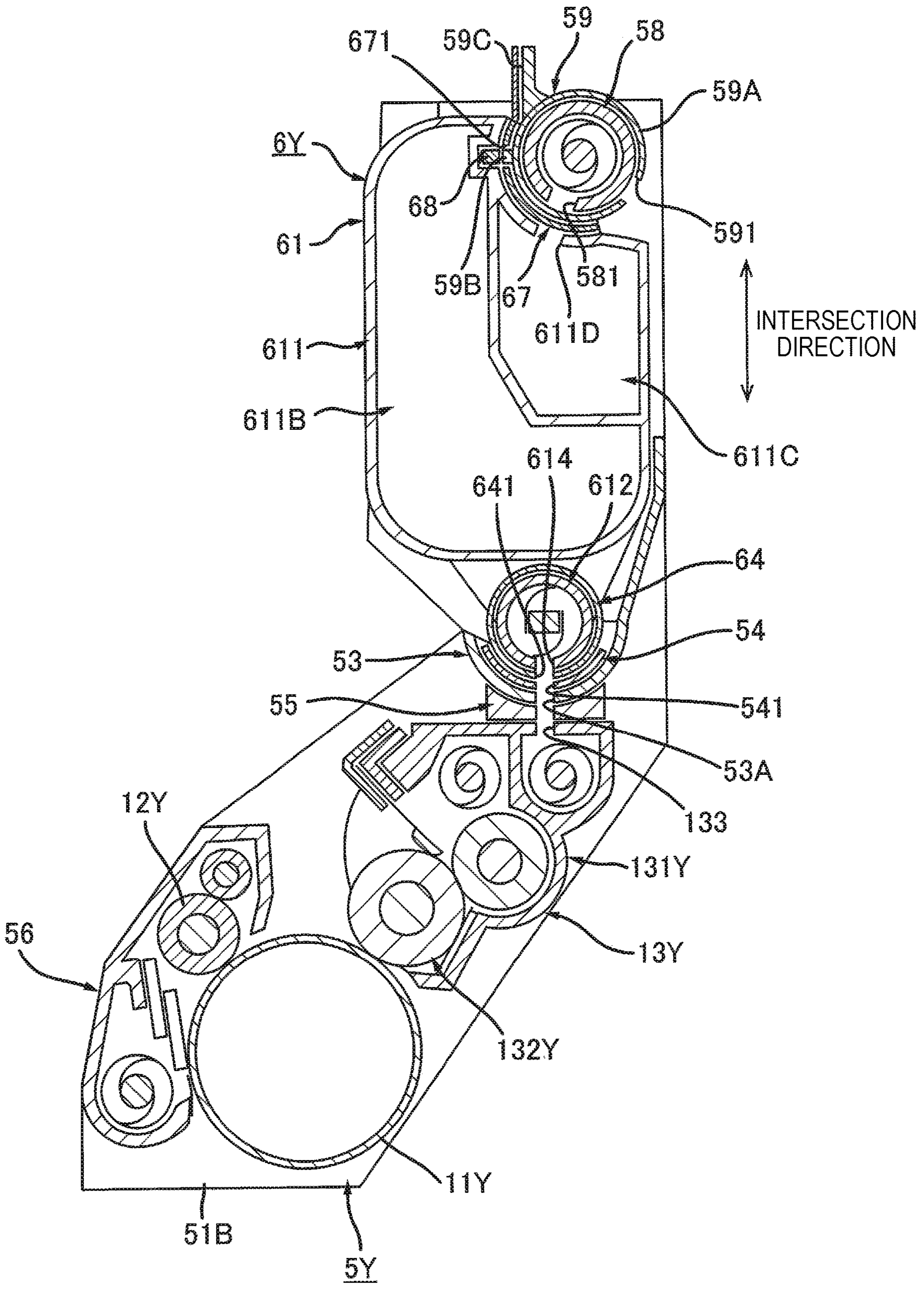
FIG. 8 depicts a state where the toner cartridge is mounted to the drum cartridge, the toner housing is located in a second position and a lock member is located in a lock release position.
Figure 9:
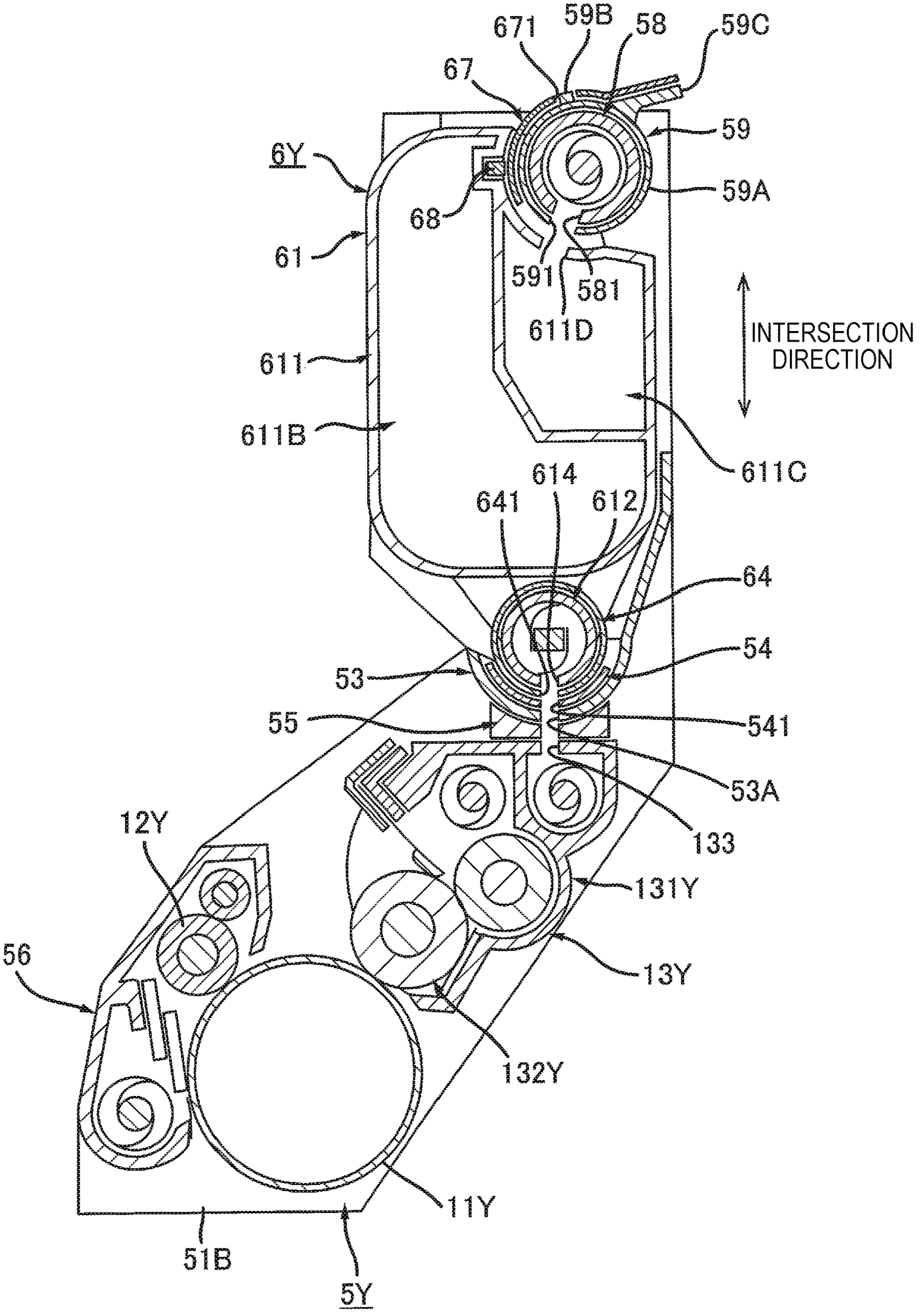
FIG. 9 depicts a state where the toner cartridge is mounted to the drum cartridge, the toner housing is located in the second position and the lock member is located in a lock position.

The lock member 59 is configured to lock the toner cartridge 6Y to the drum cartridge 5Y. Specifically, as shown in FIGS. 7 and 8, in a state where the toner cartridge 6Y is supported to the drum cartridge 5Y, a toner housing 61 of the toner cartridge 6Y can move between a first position (refer to FIG. 7) and a second position (refer to FIG. 8) with respect to the drum cartridge 5Y. The toner housing 61 will be described later. The lock member 59 can move between a lock position (refer to FIG. 9) and a lock release position (refer to FIG. 8). As shown in FIG. 9, in a state where the toner housing 61 is located in the second position and the lock member 59 is located in the lock position, the lock member 59 locks the toner housing 61 to the second position. As shown in FIG. 8, in a state where the lock member 59 is located in the lock release position, the lock member 59 releases a locked state of the toner housing 61.

As shown in FIG. 3, the lock member 59 includes a shutter 59A, a projection 59B, and a lock lever 59C. In other words, the drum cartridge 5Y includes the shutter 59A.

2.11.1 Shutter 59A

The shutter 59A is a main body part of the lock member 59. The shutter 59A extends in the axis direction. The shutter 59A has a cylindrical shape. The shutter 59A is located on the circumferential surface of the pipe 58. The shutter 59A can rotate with respect to the pipe 58. Thereby, the lock member 59 can rotate with respect to the pipe 58.

As shown in FIGS. 8 and 9, the shutter 59A can move between a shutter-closed position (refer to FIG. 8) and a shutter-opened position (refer to FIG. 9) with respect to the transfer residual toner discharge hole 581.

As shown in FIG. 8, in a state where the lock member 59 is located in the lock release position, the shutter 59A is located in the shutter-closed position. In the state where the shutter 59A is located in the shutter-closed position, the shutter 59A closes the transfer residual toner discharge hole 581.

On the other hand, as shown in FIG. 9, in a state where the lock member 59 is located in the lock position, the shutter 59A is located in the shutter-opened position. In the state where the shutter 59A is located in the shutter-opened position, the transfer residual toner discharge hole 581 is opened. Specifically, the shutter 59A has a shutter opening 591. In the state where the shutter 59A is located in the shutter-opened position, at least a part of the shutter opening 591 communicates with the transfer residual toner discharge hole 581. Thereby, the transfer residual toner discharge hole 581 is opened. On the other hand, as shown in FIG. 8, in the state where the shutter 59A is located in the shutter-closed position, the shutter opening 591 is located distant from the transfer residual toner discharge hole 581.

2.11.2 Projection 59B

As shown in FIG. 3, the projection 59B is located on a circumferential surface of the shutter 59A. The projection 59B protrudes from the circumferential surface of the shutter 59A. The projection 59B extends in a diametrical direction of the shutter 59A. Note that, the projection 59B may also be attached to the shutter 59A.

2.11.3 Lock Lever 59C

The lock lever 59C is located on the circumferential surface of the shutter 59A. The lock lever 59C is located distant from the projection 59B. The lock lever 59C extends from the circumferential surface of the shutter 59A. Note that, the lock lever 59C may also be attached to the shutter 59A.

3. Details of Toner Cartridge 6Y

Subsequently, the toner cartridge 6Y is described in detail with reference to FIGS. 7 to 12. Note that, the toner cartridges 6M, 6C and 6K are described in a similar manner to the toner cartridge 6Y. For this reason, the descriptions of the toner cartridges 6M, 6C and 6K are omitted.

In descriptions of the toner cartridge 6Y, "the axis direction" and "the intersection direction" are "the axis direction" and "the intersection direction" "in the state where the toner cartridge 6Y is supported to the drum cartridge 5Y and is located in the second position".

Figure 10:
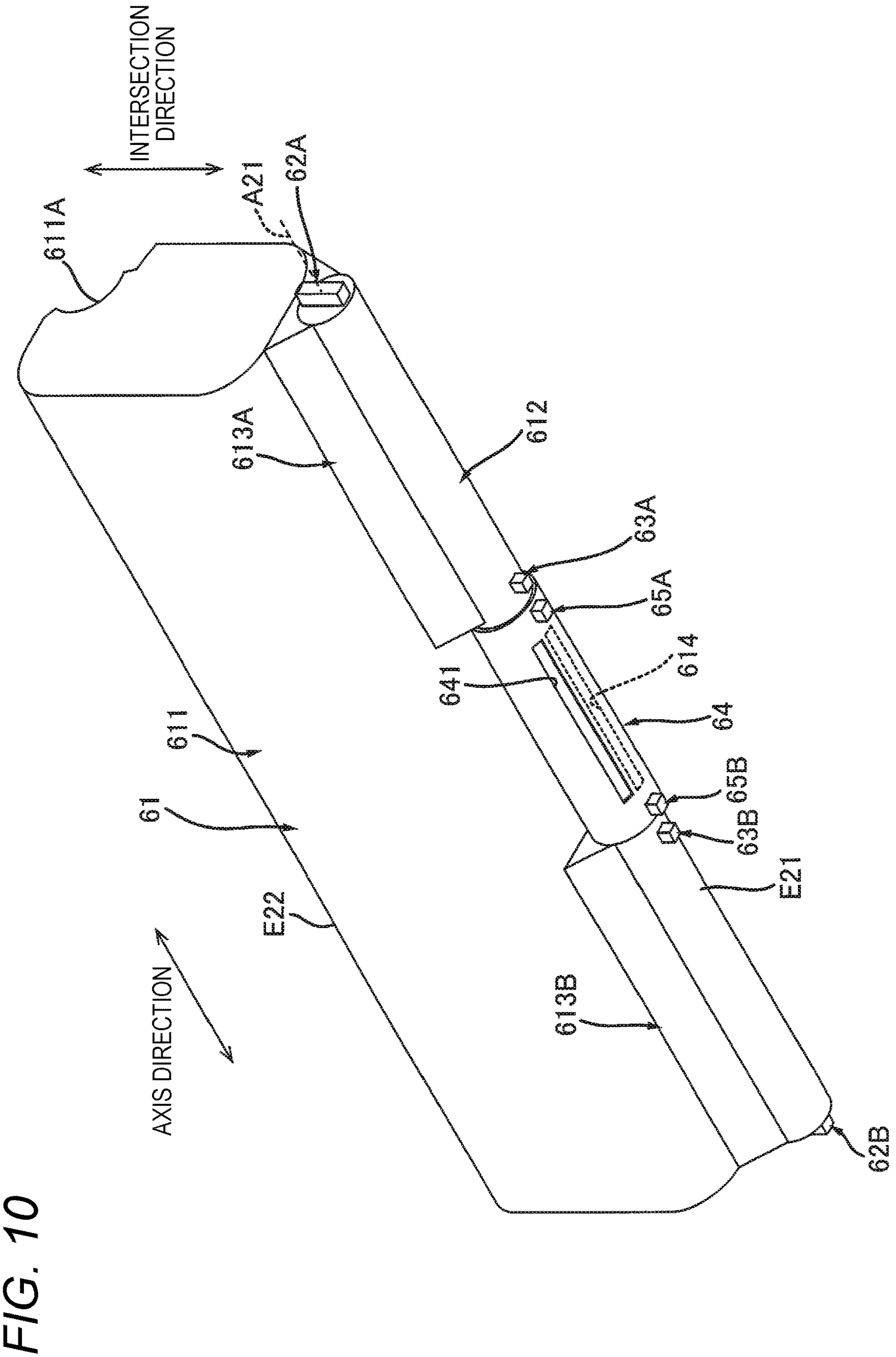
FIG. 10 is a perspective view of the toner cartridge, depicting a state where the shutter is located in a closed position.

As shown in FIG. 10, the toner cartridge 6Y extends in the axis direction. The toner cartridge 6Y includes a toner housing 61, two projections 62A and 62B, two projections 63A and 63B, a shutter 64, two projections 65A and 65B, a toner conveying member 66 (refer to FIGS. 11A and 11B), a shutter 67 (refer to FIG. 11A), and a lock pin 68 (refer to FIG. 11A).

3.1 Toner Housing 61

The toner housing 61 extends in the axis direction. The toner housing 61 has a first end portion E21 and a second end portion E22 in the intersection direction. The second end portion E22 is located distant from the first end portion E21 in the intersection direction. The toner housing 61 includes a first accommodation unit 611, a second accommodation unit 612, and two connection parts 613A and 613B.

3.1.1 First Accommodation Unit 611

The first accommodation unit 611 is located at the second end portion E22 of the toner housing 61 in the intersection direction. The first accommodation unit 611 extends in the axis direction. The first accommodation unit 611 has a tubular shape. Specifically, the first accommodation unit 611 has a square tube shape. A volume of the first accommodation unit 611 is greater than a volume of the second accommodation unit 612.

Figure 11B:
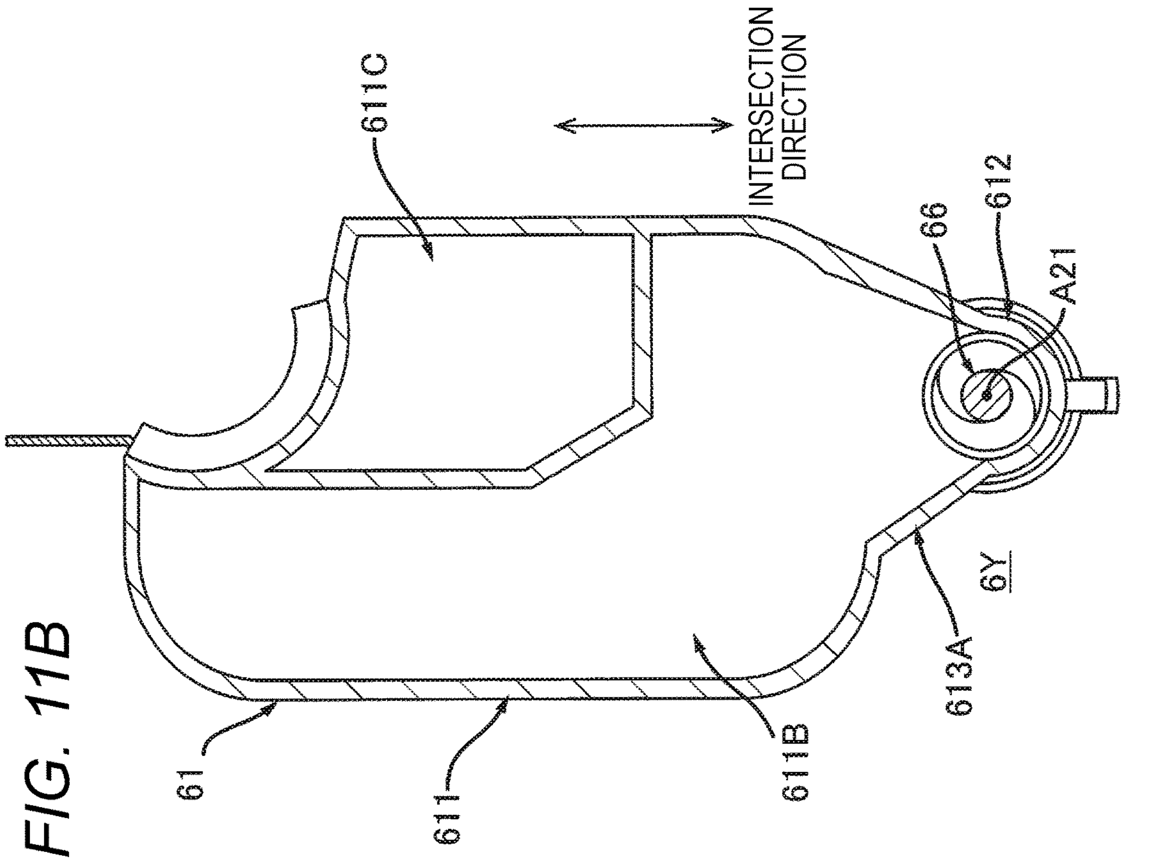
FIG. 11B is a sectional view of the toner cartridge shown in FIG. 10 passing through a connection part.
Figure 11A:
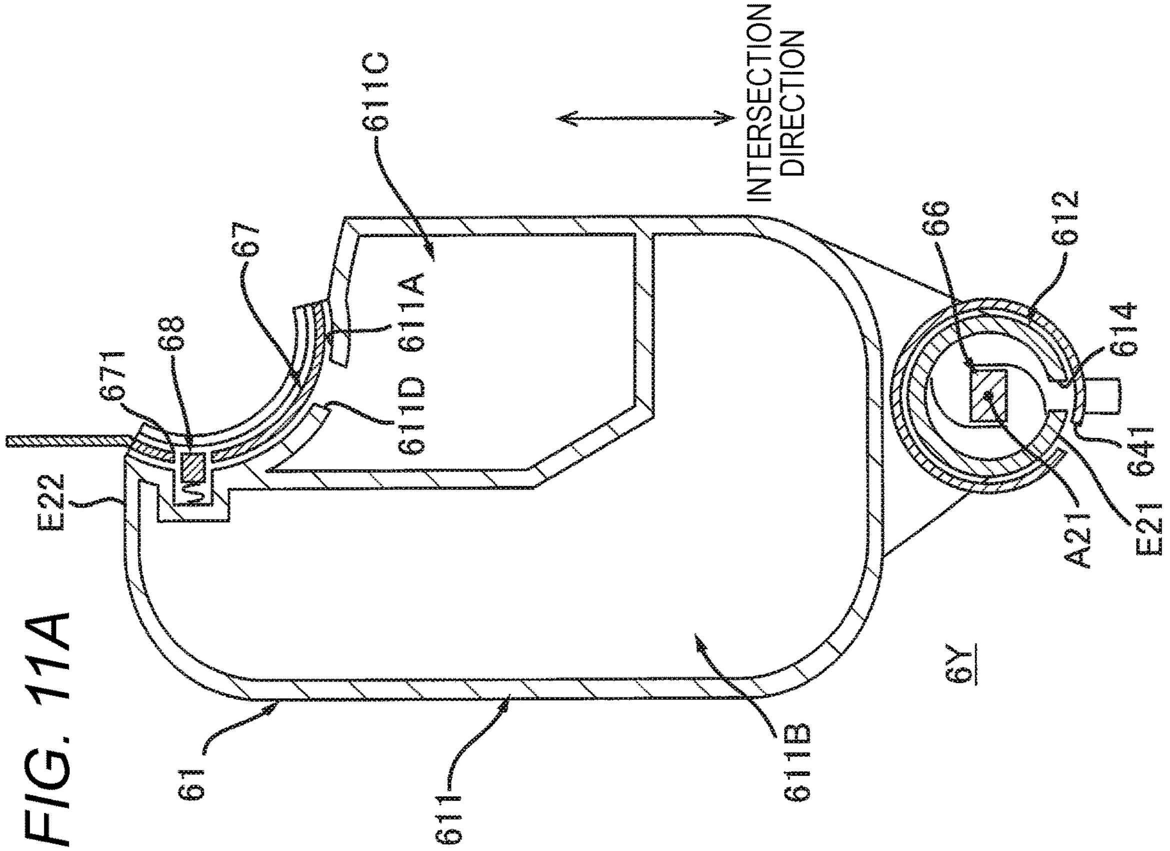
FIG. 11A is a sectional view of the toner cartridge shown in FIG. 10 passing through a toner discharge hole and a transfer residual toner receiving hole.

As shown in FIG. 11A, the first accommodation unit 611 includes a concave part 611A, a toner accommodation part 611B, and a transfer residual toner accommodation part 611C.

3.1.1.1 Concave Part 611A

The concave part 611A is located at the second end portion E22 of the toner housing 61. The concave part 611A is located distant from the second accommodation unit 612 in the intersection direction. The concave part 611A has a circular arc shape. The concave part 611A has a transfer residual toner receiving hole 611D. In other words, the toner housing 61 has the transfer residual toner receiving hole 611D. The toner cartridge 6Y has the transfer residual toner receiving hole 611D. The transfer residual toner receiving hole 611D communicates with an internal space of the transfer residual toner accommodation part 611C.

3.1.1.2 Toner Accommodation Part 611B

The toner accommodation part 611B can accommodate the toner. As shown in FIG. 9, in the state where the toner cartridge 6Y is supported to the drum cartridge 5Y and the toner housing 61 is located in the second position, the toner in the toner accommodation part 611B is supplied to the developing device 13Y.

3.1.1.3 Transfer Residual Toner Accommodation Part 611C

As shown in FIG. 11A, the transfer residual toner accommodation part 611C is located between the concave part 611A and the second accommodation unit 612 in the intersection direction. The transfer residual toner accommodation part 611C can accommodate the transfer residual toner. The internal space of the transfer residual toner accommodation part 611C does not communicate with an internal space of the toner accommodation part 611B.

3.1.2 Second Accommodation Unit 612

As shown in FIG. 10, the second accommodation unit 612 is located at the first end portion E21 of the toner housing 61 in the intersection direction. The second accommodation unit 612 is located distant from the first accommodation unit 611 in the intersection direction. The second accommodation unit 612 extends in the axis direction. The second accommodation unit 612 has a cylindrical shape. The second accommodation unit 612 has a toner discharge hole 614. In other words, the toner cartridge 6Y has a toner discharge hole 614.

The toner discharge hole 614 is located at a central part of the second accommodation unit 612 in the axis direction. The toner discharge hole 614 is located between the projection 63A and the projection 63B in the axis direction. The toner discharge hole 614 extends in the axis direction. The toner discharge hole 614 can discharge the toner.

3.1.3 Connection Parts 613A and 613B

The connection part 613A is located between one end portion of the first accommodation unit 611 in the axis direction and one end portion of the second accommodation unit 612 in the axis direction. The connection part 613A interconnects one end portion of the first accommodation unit 611 in the axis direction and one end portion of the second accommodation unit 612 in the axis direction.

The connection part 613B is located between the other end portion of the first accommodation unit 611 in the axis direction and the other end portion of the second accommodation unit 612 in the axis direction. The connection part 613B is located at an interval from the connection part 613A in the axis direction. The connection part 613B interconnects the other end portion of the first accommodation unit 611 in the axis direction and the other end portion of the second accommodation unit 612 in the axis direction.

As shown in FIG. 11B, the second accommodation unit 612 communicates with the toner accommodation part 611B via the connection part 613A. Similarly, the second accommodation unit 612 communicates with the toner accommodation part 611B via the connection part 613B (refer to FIG. 10). The toner in the first accommodation unit 611 enters the second accommodation unit 612 through the connection parts 613A and 613B.

3.2 Projections 62A and 62B

As shown in FIG. 10, the projection 62A is located at one end portion of the toner cartridge 6Y in the axis direction. The projection 62A is located at one end portion of the second accommodation unit 612 in the axis direction. The projection 62A protrudes from one end portion of the second accommodation unit 612 in the axis direction. The projection 62A protrudes in the axis direction.

The projection 62B is located at the other end portion of the toner cartridge 6Y in the axis direction. The projection 62B is located at the other end portion of the second accommodation unit 612 in the axis direction. The projection 62B protrudes from the other end portion of the second accommodation unit 612 in the axis direction. The projection 62B protrudes in the axis direction.

3.3 Projections 63A and 63B

The projection 63A is located between the toner discharge hole 614 and the projection 62A in the axis direction. The projection 63A is located between the shutter 64 and the projection 62A in the axis direction. The projection 63A is located on an opposite side to the first accommodation unit 611 with respect to the second accommodation unit 612 in the intersection direction. The projection 63A extends from a circumferential surface of the second accommodation unit 612.

The projection 63B is located distant from the projection 63A in the axis direction. The projection 63B is located on an opposite side to the projection 63A with respect to the toner discharge hole 614 in the axis direction. The projection 63B is located between the toner discharge hole 614 and the projection 62B in the axis direction. The projection 63B is located on an opposite side to the projection 63A with respect to the shutter 64 in the axis direction. The projection 63B is located between the shutter 64 and the projection 62B in the axis direction. The projection 63B is located on an opposite side to the first accommodation unit 611 with respect to the second accommodation unit 612 in the intersection direction. The projection 63B extends from the circumferential surface of the second accommodation unit 612.

3.4 Shutter 64

The shutter 64 is located between the connection part 613A and the connection part 613B in the axis direction. The shutter 64 is located on the circumferential surface of the second accommodation unit 612. The shutter 64 can move between a closed position (refer to FIG. 10) and an opened position (refer to FIG. 12) with respect to the toner discharge hole 614. In the state where the shutter 64 is located in the closed position, the shutter 64 closes the toner discharge hole 614.

Figure 12:
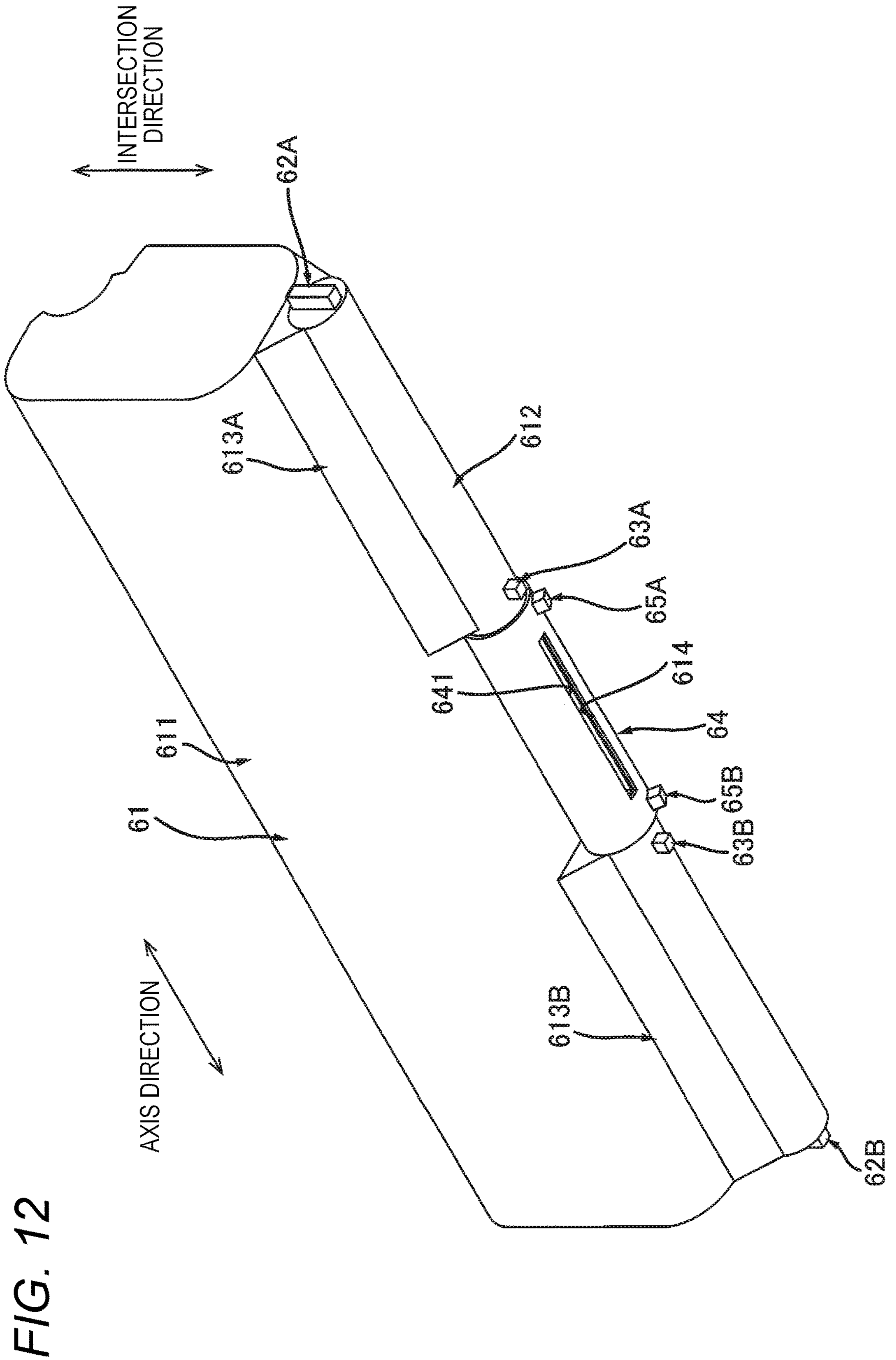
FIG. 12 is a perspective view of the toner cartridge shown in FIG. 10, depicting a state where the shutter is located in the opened position.

As shown in FIG. 12, in the state where the shutter 64 is located in the opened position, the toner discharge hole 614 is opened. The shutter 64 extends in the axis direction. The shutter 64 has a cylindrical shape. The shutter 64 has an opening 641. The opening 641 extends in the axis direction. In the state where the shutter 64 is located in the opened position, at least a part of the opening 641 communicates with the toner discharge hole 614.

As shown in FIG. 10, in the state where the shutter 64 is located in the closed position, the opening 641 is located distant from the toner discharge hole 614.

3.5 Projections 65A and 65B

The projection 65A is located on a circumferential surface of the shutter 64. The projection 65A extends from the circumferential surface of the shutter 64. The projection 65A is located between the opening 641 and the projection 63A in the axis direction.

The projection 65B is located distant from the projection 65A in the axis direction. The projection 65B is located on an opposite side to the projection 65A with respect to the opening 641 in the axis direction. The projection 65B is located on the circumferential surface of the shutter 64. The projection 65B extends from the circumferential surface of the shutter 64. The projection 65B is located between the opening 641 and the projection 63B in the axis direction.

3.6 Toner Conveying Member 66

As shown in FIGS. 11A and 11B, the toner conveying member 66 is located inside of the second accommodation unit 612. The toner conveying member 66 can rotate about an axis A21. The axis A21 extends in the axis direction. The toner conveying member 66 extends along the axis A21. The toner conveying member 66 is configured to convey the toner that enters the second accommodation unit 612 through the connection part 613A toward the toner discharge hole 614 and to convey the toner that enters the second accommodation unit 612 through the connection part 613B toward the toner discharge hole 614.

3.7 Shutter 67

As shown in FIG. 11A, the shutter 67 is located at the second end portion E22 of the toner housing 61 in the intersection direction. The shutter 67 is located at the concave part 611A. The shutter 67 is a curved plate. The shutter 67 extends along the concave part 611A. The shutter 67 has a circular arc shape. The shutter 67 can move between a closed position (refer to FIG. 8) and an opened position (refer to FIG. 9). As shown in FIG. 8, in a state where the shutter 67 is located in the closed position, the shutter 67 closes the transfer residual toner receiving hole 611D. As shown in FIG. 9, in a state where the shutter 67 is located in the opened position, the transfer residual toner receiving hole 611D is opened.

As shown in FIG. 11A, the shutter 67 has a through-hole 671.

3.8 Lock Pin 68

The lock pin 68 is located at the second end portion E22 of the toner housing 61 in the intersection direction. The lock pin 68 is located at the concave part 611A. The lock pin 68 can move between a lock position (refer to FIG. 11A) and a lock release position (refer to FIG. 8) with respect to the shutter 67 located in the closed position.

As shown in FIG. 11A, in a state where the shutter 67 is located in the closed position and the lock pin 68 is located in the lock position, the lock pin 68 is fitted in the through-hole 671 of the shutter 67. Thereby, in the state where the shutter 67 is located in the closed position and the lock pin 68 is located in the lock position, the lock pin 68 locks the shutter 67 to the closed position. In other words, the lock pin 68 stops movement of the shutter 67 from the closed position to the opened position.

On the other hand, as shown in FIG. 8, in a state where the shutter 67 is located in the closed position and the lock pin 68 is located in the lock release position, the lock pin 68 separates from the through-hole 671 of the shutter 67. Thereby, in the state where the shutter 67 is located in the closed position and the lock pin 68 is located in the lock release position, the lock pin 68 releases a locked state of the shutter 67. In other words, the lock pin 68 allows the shutter 67 to move from the closed position to the opened position.

3.9 Mounting of Toner Cartridge 6Y to Main Body Housing 2

When mounting the toner cartridge 6Y to the main body housing 2, an operator first mounts the toner cartridge 6Y to the drum cartridge 5Y. Note that, the drum cartridge 5Y may be removed from the drawer 4 or may be mounted to the drawer 4 located in the outer position.

When mounting the toner cartridge 6Y to the drum cartridge 5Y, the operator first fits the projection 62A (refer to FIG. 10) to the toner guide 52A (refer to FIG. 3) and fits the projection 62B (refer to FIG. 10) to the toner guide 52B (refer to FIG. 3).

Thereby, the second accommodation unit 612 of the toner cartridge 6Y is guided toward the receiving part 53 by the toner guide 52A and the toner guide 52B. The second accommodation unit 612 is fitted in the receiving part 53, as shown in FIG. 7.

Then, the toner cartridge 6Y is supported to the drum cartridge 5Y. At this time, the toner housing 61 is located in the first position.

In the state where the toner cartridge 6Y is supported to the drum cartridge 5Y and the toner housing 61 is located in the first position, the projection 65A (refer to FIG. 10) is fitted in the hole 53B (refer to FIG. 3) of the receiving part 53 through the through-hole 542A (refer to FIG. 3) of the shutter 54, and the projection 65B (refer to FIG. 10) is fitted in the hole 53C (refer to FIG. 3) of the receiving part 53 through the through-hole 542B (refer to FIG. 3) of the shutter 54. The projection 65A is fitted in the hole 53B of the receiving part 53 and the projection 65B is fitted in the hole 53C of the receiving part 53, so that the shutter 64 is fixed to the receiving part 53.

Also, the projection 63A (refer to FIG. 10) is fitted in the through-hole 543A (refer to FIG. 3) of the shutter 54 and the projection 63B (refer to FIG. 10) is fitted in the through-hole 543B (refer to FIG. 3) of the shutter 54. The projection 63A is fitted in the through-hole 543A of the shutter 54 and the projection 63B is fitted in the through-hole 543B of the shutter 54, so that the shutter 54 can move together with the toner housing 61.

Then, as shown in FIGS. 7 and 8, the operator moves the toner housing 61 from the first position to the second position. At this time, the toner housing 61 is pivoted with respect to the second accommodation unit 612.

Then, the movement of the toner housing 61 from the first position to the second position locates the shutter 64 from the closed position to the opened position with respect to the toner housing 61. Also, as the toner housing 61 moves from the first position to the second position, the shutter 54 moves from the closed position to the opened position.

As shown in FIG. 8, when the toner housing 61 is located in the second position, the shutter 64 is located in the opened position and the shutter 54 is located in the opened position. Then, in the state where the toner cartridge 6Y is supported to the drum cartridge 5Y and the toner housing 61 is located in the second position, the toner discharge hole 614 communicates with the toner receiving hole 53A. Thereby, the toner receiving hole 53A can receive the toner discharged from the toner discharge hole 614.

Also, when the toner housing 61 is located in the second position, the shutter 67 of the toner cartridge 6Y is contacted to the lock member 59 of the drum cartridge 5Y. Specifically, in the state where the toner housing 61 is located in the second position, the shutter 67 located in the closed position is contacted to the lock member 59 located in the lock release position. Then, the projection 59B of the lock member 59 is fitted in the through-hole 671 of the shutter 67 while moving the lock pin 68 from the lock position (refer to FIG. 7) to the lock release position (refer to FIG. 8). Thereby, the shutter 67 can move from the closed position to the opened position, together with the lock member 59.

Then, as shown in FIGS. 8 and 9, the operator moves the lock member 59 from the lock release position to the lock position. As the lock member 59 is moved, the shutter 59A moves from the shutter-closed position to the shutter-opened position and the shutter 67 moves from the closed position to the opened position.

As shown in FIG. 9, when the lock member 59 is located in the lock position, the toner housing 61 is locked in the second position. Specifically, in the state where the lock member 59 is located in the lock position, the projection 59B of the lock member 59 extends in a direction of intersecting with the moving direction of the toner housing 61 from the second position to the first position. In this state, since the projection 59B of the lock member 59 is fitted in the through-hole 671 of the shutter 67, the toner housing 61 cannot move from the second position to the first position. Thereby, the toner cartridge 6Y cannot be removed from the drum cartridge 5Y. That is, in the state where the toner housing 61 is located in the second position, the toner cartridge 6Y cannot be removed from the drum cartridge 5Y.

Also, when the lock member 59 is located in the lock position, the shutter 59A is located in the shutter-opened position and the shutter 67 is located in the opened position, so that the transfer residual toner receiving hole 611D communicates with the transfer residual toner discharge hole

581. That is, in a state where the toner cartridge 6Y is supported to the drum cartridge 5Y, the toner housing 61 is located in the second position, the shutter 59A is located in the shutter-opened position and the shutter 67 is located in the opened position, the transfer residual toner receiving hole 611D communicates with the transfer residual toner discharge hole 581. Thereby, the transfer residual toner receiving hole 611D can receive the transfer residual toner discharged from the transfer residual toner discharge hole 581.

By the above, the mounting of the toner cartridge 6Y to the drum cartridge 5Y is completed. The "state where the toner cartridge 6Y is mounted to the drum cartridge 5Y" means the state where the toner cartridge 6Y is supported to the drum cartridge 5Y, the toner housing 61 is located in the second position and the lock member 59 is located in the lock position.

In a case where the drum cartridge 5Y is removed from the drawer 4, the operator locates the drawer 4 in the outer position to support the drum cartridge 5Y having the toner cartridge 6Y mounted thereto by the drawer 4. Then, the operator moves the drawer 4 from the outer position to the inner position.

Also, in a case where the drum cartridge 5Y is supported to the drawer 4 located in the outer position, the operator moves the drawer 4 from the outer position to the inner position after the mounting of the toner cartridge 6Y to the drum cartridge 5Y is completed.

By the above, the mounting of the toner cartridge 6Y to the main body housing 2 is completed.

3.10 Removal of Toner Cartridge 6Y from Main Body Housing 2

In order to remove the toner cartridge 6Y from the main body housing 2, the operator first moves the drawer 4 from the inner position to the outer position.

Then, as shown in FIGS. 9 and 8, the operator moves the lock member 59 from the lock position (refer to FIG. 9) to the lock release position (refer to FIG. 8).

Then, as shown in FIG. 9, in the state where the lock member 59 is located in the lock release position, the shutter 59A is located in the shutter-closed position and the shutter 67 is located in the closed position.

Then, as shown in FIGS. 8 and 7, the operator moves the toner housing 61 from the second position (refer to FIG. 8) to the first position (refer to FIG. 7).

Then, as shown in FIG. 7, in the state where the toner housing 61 is located in the first position, the shutter 64 is located in the closed position and the shutter 54 is located in the closed position.

Also, in the state where the toner housing 61 is located in the first position, the transfer residual toner receiving hole 611D is located distant from the transfer residual toner discharge hole 581. Also, in the state where the toner housing 61 is located in the first position, the shutter 67 is located distant from the lock member 59¥. Also, in the state where the toner housing 61 is located in the first position, the toner housing 61 is located distant from the pipe 58. Thereby, in the state where the toner housing 61 is located in the first position, the toner cartridge 6Y can be removed from the drum cartridge 5Y.

Also, as shown in FIG. 2, in the state where the drawer 4 is located in the outer position and the toner housing 61 is located in the first position, the transfer residual toner receiving hole 611D (refer to FIG. 7) is located downstream of the transfer residual toner discharge hole 581 (refer to FIG. 7) with respect to the moving direction of the drawer 4 from the inner position to the outer position. In other words, in the state where the drawer 4 is located in the outer position and the toner housing 61 is located in the first position, the transfer residual toner discharge hole 581 (refer to FIG. 7) is located between the transfer residual toner receiving hole 611D (refer to FIG. 7) and the second end portion E2 of the main body housing 2 in the moving direction of the drawer 4.

Then, the operator removes the toner cartridge 6Y from the drum cartridge 5Y. By the above, the removal of the toner cartridge 6Y from the main body housing 2 is completed.

4. Operational Effects (1) According to the drum cartridge 5Y, as shown in FIG. 3, the pipe 58 extending in the axis direction is provided between the drum side plate 51A and the drum side plate 51B.

For this reason, the user can carry the drum cartridge 5Y while gripping the pipe 58.

As a result, the user can easily carry the drum cartridge 5Y.

(2) According to the drum cartridge 5Y, as shown in FIG. 6, the transfer residual toner discharge hole 581 is located at the central part of the pipe 58 in the axis direction.

For this reason, it is possible to discharge the transfer residual toner from the central part in the axis direction.

As a result, it is possible to accommodate the transfer residual toner uniformly in the axis direction in the transfer residual toner accommodation part 611C configured to accommodate the discharged transfer residual toner.

(3) According to the drum cartridge 5Y, as shown in FIG. 6, the seal member 55 is located between the developing housing 131Y and the receiving part 53. The seal member 55 surrounds the developing opening 133 and the toner receiving hole 53A.

For this reason, it is possible to suppress the toner, which enters the toner receiving hole 53A, from being leaked between the receiving part 53 and the developing housing 131Y by the seal member 55.

(4) According to the drum cartridge 5Y, as shown in FIG. 9, in the state where the toner housing 61 is located in the second position, the transfer residual toner receiving hole 611D communicates with the transfer residual toner discharge hole 581. In the state where the toner housing 61 is located in the second position, the toner cartridge 6Y cannot be removed from the drum cartridge 5Y.

For this reason, in the state where the transfer residual toner discharge hole 581 and the transfer residual toner receiving hole 611D communicate with each other, the toner cartridge 6Y can be prevented from being removed from the drum cartridge 5Y.

As a result, it is possible to suppress the transfer residual toner from being leaked.

(5) According to the drum cartridge 5Y, as shown in FIG. 9, in the state where the toner housing 61 is located in the second position and the lock member 59 is located in the lock position, the lock member 59 locks the toner housing 61 to the second position.

For this reason, in the state where the toner housing 61 is located in the second position and the transfer residual toner discharge hole 581 and the transfer residual toner receiving hole 611D communicate with each other, it is possible to lock the toner housing 61 by the lock member 59.

Thereby, in the state where the transfer residual toner discharge hole 581 and the transfer residual toner receiving hole 611D communicate with each other, it is possible to securely prevent the toner cartridge 6Y from being removed from the drum cartridge 5Y.

As a result, it is possible to further suppress the transfer residual toner from being leaked.

Also, as shown in FIG. 8, in the state where the lock member 59 is located in the lock release position, the shutter 59A is located in the shutter-closed position.

Thereby, in the state where the lock member 59 is located in the lock release position, it is possible to close the transfer residual toner discharge hole 581 by the shutter 59A.

As a result, it is possible to further suppress the transfer residual toner from being leaked.

(6) According to the image forming apparatus 1, as shown in FIG. 2, in the state where the drawer 4 is located in the outer position and the toner housing 61 is located in the first position, the transfer residual toner receiving hole 611D (refer to FIG. 7) may be located downstream of the transfer residual toner discharge hole 581 (refer to FIG. 7) with respect to the direction in which the drawer 4 moves from the inner position to the outer position.

For this reason, after moving the drawer 4 from the inner position to the outer position, the user can move the toner housing 61 downstream of the direction in which the drawer 4 moves from the inner position to the outer position, thereby positioning the toner housing 61 in the first position.

Thereby, it is possible to implement the movement of the drawer 4 to the outer position and the movement of the toner housing 61 to the first position from the same side (the downstream side of the direction in which the drawer 4 moves from the inner position to the outer position).

As a result, the user can easily operate the drawer 4 and the toner cartridge 6Y.

5. Modified Illustrative Embodiments

The toner cartridge 6Y may also be a developing cartridge having the developing roller 132M. In this case, the drum cartridge 5Y is not provided with the developing device 13Y and the receiving part 53.

As discussed above, the disclosure may provide at least the following illustrative, non-limiting aspects.

(1) A drum cartridge of the present disclosure includes a photosensitive drum, a drum cleaner, a first drum side plate, a second drum side plate, a pipe, and a conveyor device. The photosensitive drum can rotate about a drum axis. The drum axis extends in an axis direction.

The drum cleaner includes a cleaning member, and a cleaning housing. The cleaning member is configured to clean a circumferential surface of the photosensitive drum. The cleaning housing is configured to accommodate transfer residual toner. The transfer residual toner is removed from the circumferential surface of the photosensitive drum by the cleaning member.

The first drum side plate is configured to support one end portion of the photosensitive drum in the axis direction.

The second drum side plate is located distant from the first drum side plate in the axis direction. The second drum side plate is configured to support the other end portion of the photosensitive drum in the axis direction.

The pipe is located between the first drum side plate and the second drum side plate in the axis direction. The pipe extends in the axis direction. One end portion of the pipe in the axis direction connects to the first drum side plate. The other end portion of the pipe in the axis direction connects to the second drum side plate.

The conveyor device is configured to convey the transfer residual toner from the cleaning housing to the pipe.

According to the above configuration, the pipe extending in the axis direction is provided between the first drum side plate and the second drum side plate.

For this reason, a user can carry the drum cartridge while gripping the pipe.

As a result, the user can easily carry the drum cartridge.

(2) The drum cartridge may be configured to support a toner cartridge. The toner cartridge includes a toner housing. The toner housing may have: a toner discharge hole for discharging toner; and a transfer residual toner receiving hole for receiving the transfer residual toner. The pipe may have a transfer residual toner discharge hole. The toner discharge hole is able to discharge the transfer residual toner. The transfer residual toner discharge hole may communicate with the transfer residual toner receiving hole in a state the toner cartridge is supported to the drum cartridge.

(3) The transfer residual toner discharge hole may be located at a central part of the pipe in the axis direction.

According to the above configuration, it is possible to discharge the transfer residual toner from the central part in the axis direction.

For this reason, it is possible to accommodate the transfer residual toner uniformly in the axis direction in the transfer residual toner accommodation part configured to accommodate the discharged transfer residual toner.

(4) The drum cartridge may further include a developing device. The developing device includes a developing roller and a developing housing. The developing roller is rotatable about a developing axis extending in the axis direction. The developing housing is configured to support the developing roller. The developing device may be located between the first drum side plate and the second drum side plate in the axis direction.

(5) The developing device is supported to be movable with respect to the photosensitive drum by the first drum side plate and the second drum side plate. The developing housing has a developing opening. The drum cartridge may further include a receiving part and a seal member. The receiving part is configured to receive the toner cartridge in a state the toner cartridge is supported to the drum cartridge. The receiving part has a toner receiving hole. The toner receiving hole is formed to communicate with the toner discharge hole in the state the toner cartridge is supported to the drum cartridge. The toner receiving hole communicates with the developing opening of the developing housing. The seal member is located between the developing housing and the receiving part. The seal member is configured to surround the developing opening and the toner receiving hole.

According to the above configuration, it is possible to suppress the toner, which enters the toner receiving hole, from being leaked between the receiving part and the developing housing by the seal member.

(6) The first drum side plate may include a first toner guide. The first toner guide guides one end portion of the toner cartridge in the axis direction at the time when the toner cartridge is supported to the drum cartridge. The first toner guide extends in a guide direction of intersecting with the axis direction. The second side plate may have a second toner guide. The second toner guide guides the other end portion of the toner cartridge in the axis direction at the time when the toner cartridge is supported to the drum cartridge. The second toner guide extends in the guide direction.

(7) In a state the toner cartridge is supported to the drum cartridge, the toner housing may be movable between a first position and a second position. In a state the toner housing is located in the first position, the transfer residual toner receiving hole is located distant from the transfer residual toner discharge hole. In a state the toner housing is located in the second position, the transfer residual toner receiving hole communicates with the transfer residual toner discharge hole. In the state the toner housing is located in the first position, the toner cartridge is removable from the drum cartridge. In the state the toner housing is located in the second position, the toner cartridge is not removable from the drum cartridge.

According to the above configuration, it is possible to prevent the toner cartridge from being removed from the drum cartridge in the state the transfer residual toner discharge hole and the transfer residual toner receiving hole communicate with each other.

As a result, it is possible to suppress the transfer residual toner from being leaked.

(8) The drum cartridge may further include a lock member and a shutter. The lock member is movable between a lock position and a lock release position. In a state the toner housing is located in the second position and the lock member is located at the lock position, the lock member locks the toner housing in the second position. In the state the lock member is located at the lock release position, the lock member releases the locked state of the toner housing. The shutter is movable between a shutter-closed position and a shutter-opened position. In a state the shutter is located at the shutter-closed position, the shutter closes the transfer residual toner discharge hole. In a state the shutter is located at the shutter-opened position, the transfer residual toner discharge hole is opened. In a state the lock member is located in the lock release position, the shutter is located in the shutter-closed position. In a state the lock member is located in the lock position, the shutter is located in the shutter-opened position.

According to the above configuration, it is possible to lock the toner housing by the lock member in the state the toner housing is located in the second position and the transfer residual toner discharge hole and the transfer residual toner receiving hole communicate with each other.

For this reason, it is possible to securely prevent the toner cartridge from being removed from the drum cartridge in the state the transfer residual toner discharge hole and the transfer residual toner receiving hole communicate with each other.

As a result, it is possible to further suppress the transfer residual toner from being leaked.

Also, it is possible to close the transfer residual toner discharge hole by the shutter in the state the lock member is located in the lock release position.

Thereby, it is possible to further suppress the transfer residual toner from being leaked.

(9) An image forming apparatus of the present disclosure includes: the drum cartridge; a main body housing; and a drawer. The main body housing has an opening. The main body housing includes a cover. The main body housing is movable between a cover-closed position and a cover-opened position. In a state the main body housing is located at the cover-closed position, the cover closes the opening. In a state the main body housing is located at the cover-opened position, the opening is opened. The drawer is movable between an inner position and an outer position in a moving direction through the opening, in a state the cover is located in the cover-opened position. The moving direction of the drawer intersects with the axis direction. In a state the drawer is located at the inner position, the drawer is located inside of the main body housing. In a state the drawer is located at the outer position, the drawer is located outside of the main body housing. The drawer is configured to support the drum cartridge.

(10) An image forming apparatus according to the disclosure may further include a toner cartridge. The drum cartridge may be configured to support the toner cartridge.

(11) In a state the drawer is located in the outer position and the toner cartridge is located in the first position, the transfer residual toner receiving hole may be located downstream of the transfer residual toner discharge hole with respect to a direction in which the drawer moves from the inner position to the outer position.

According to the above configuration, after moving the drawer from the inner position to the outer position, the user can move the toner housing downstream of the direction in which the drawer moves from the inner position to the outer position, thereby positioning the toner housing in the first position.

For this reason, it is possible to implement the movement of the drawer to the outer position and the movement of the toner housing to the first position from the same side (the downstream side of the direction in which the drawer moves from the inner position to the outer position).

As a result, the user can easily operate the drawer and the toner cartridge.

(12) The main body housing may have a first end portion and a second end portion in a moving direction of the drawer. The first end portion has the opening. The second end portion is distant from the first end portion. In a state the drawer is located in the outer position and the toner cartridge is located in the first position, the transfer residual toner discharge hole may be located between the transfer residual toner receiving hole and the second end portion in the moving direction of the drawer.

What is claimed is:

1. A process cartridge comprising:

a drum cartridge configured to support a photosensitive drum, the photosensitive drum being rotatable about a drum axis extending in an axis direction; and a toner cartridge configured to accommodate toner to be supplied to the photosensitive drum, the drum cartridge comprising:

a drum cleaner configured to remove transfer residual toner from the photosensitive drum;

a toner receiving hole receiving toner from the toner cartridge; and a conveyor device configured to convey transfer residual toner from the drum cleaner to a transfer residual toner discharge hole discharging transfer residual toner from the drum cartridge, the toner cartridge comprising:

a toner chamber configured to accommodate toner having a toner discharge hole discharging toner from the toner cartridge;

a transfer residual toner chamber configured to accommodate transfer residual toner received through a transfer residual toner receiving hole receiving transfer residual toner from the drum cartridge; and a first toner shutter, wherein the toner cartridge is movable between a first position and a second position, the toner cartridge being removable from the drum cartridge in a state the toner cartridge is located in the first position, the toner cartridge being unremovable from the drum cartridge in a state the toner cartridge is located in the second position, wherein the first toner shutter is movable between a first-toner-shutter-closed position and a first-toner-shutter-opened position in conjunction with movement of the toner cartridge, the first toner shutter being configured to:

close the toner discharge hole in a case the first toner shutter is located in the first-toner-shutter-closed position, and open the toner discharge hole in a case the first toner shutter is located in first-toner-shutter-opened position, wherein in the state the toner cartridge is located in the second position, in a case the transfer residual toner discharge hole of the drum cartridge communicates with the transfer residual toner receiving hole of the toner cartridge, the toner cartridge is not movable from the second position to the first position, and in a case the transfer residual toner discharge hole does not communicate with the transfer residual toner receiving hole, the toner cartridge is movable from the second position to the first position, and wherein in the state the toner cartridge is located in the second position, in a case the toner discharge hole of the toner cartridge communicates with the toner receiving hole of the drum cartridge, the toner cartridge is not movable from the second position to the first position, and in a case the toner discharge hole does not communicate with the toner receiving hole, the toner cartridge is movable from the second position to the first position.

2. The process cartridge according to claim 1, wherein the drum cartridge further comprises:

a transfer residual toner shutter movable between a shutter-closed position and a shutter-opened position, the transfer residual tier shutter being configured to:

close the transfer residual toner discharge hole in a case the transfer residual toner shutter is located in the shutter-closed position; and open the transfer residual toner discharge hole in a case the transfer residual toner shutter is located in the shutter-opened position, wherein in the state the toner cartridge is located in the second position, in the case the transfer residual toner shutter is located in the shutter-closed position, the transfer residual toner discharge hole does not communicate with the transfer residual toner receiving hole, and in the case the transfer residual toner shutter is located in the shutter-opened position, the transfer residual toner discharge hole communicates with the transfer residual toner receiving hole.

3. The process cartridge according to claim 2, wherein the toner cartridge further comprises a second toner shutter movable between a second-toner-shutter-closed position and a second-toner-shutter-opened position, the second toner shutter being configured to:

close the transfer residual toner receiving hole in a case the second toner shutter is located in the second-toner-shutter-closed position; and open the transfer residual toner receiving hole in a case the second toner shutter is located in the second-toner-shutter-opened position, and wherein in the state the toner cartridge is located in the second position, in the case the second toner shutter is located in the second-toner-shutter-closed position, the transfer residual toner discharge hole does not communicate with the transfer residual toner receiving hole, and in the case the second toner shutter is located in the second-toner-shutter-opened position, the transfer residual toner discharge hole communicates with the transfer residual toner receiving hole.

4. The process cartridge according to claim 3, wherein the toner shutter has an engagement portion engageable with the transfer residual toner shutter, wherein the transfer residual toner shutter has an engaged portion engageable with the second toner shutter, and wherein the process cartridge is configured such that, in the state the toner cartridge is located in the second position, the engagement portion engages with the engaged portion to prevent the movement of the toner cartridge from the second position to the first position.

5. The process cartridge according to claim 1, wherein the toner cartridge further comprises a second toner shutter movable between a second-toner-shutter-closed position and a second-toner-shutter-opened position, the second toner shutter being configured to:

close the transfer residual toner receiving hole in a case the second toner shutter is located in the second-toner-shutter-closed position; and open the transfer residual toner receiving hole in a case the second toner shutter is located in the second-toner-shutter-opened position, wherein in the state the toner cartridge is located in the first position, the second toner shutter is located in the second-toner-shutter-closed position, and wherein in the state the toner cartridge is located in the second position, the second toner shutter is located in the second-toner-shutter-opened position.

6. The process cartridge according to claim 1, wherein the drum cleaner comprises:

a cleaning member configured to clean a circumferential surface of the photosensitive drum; and a cleaning housing configured to accommodate transfer residual toner removed from the circumferential surface of the photosensitive drum by the cleaning member.

7. A process cartridge comprising:

a drum cartridge configured to support a photosensitive drum, the photosensitive drum being rotatable about a drum axis extending in an axis direction; and a toner cartridge configured to accommodate toner to be supplied to the photosensitive drum, the drum cartridge comprising:

a drum cleaner configured to remove transfer residual toner from the photosensitive drum;

a toner receiving hole receiving toner from the toner cartridge; and a conveyor device configured to convey transfer residual toner from the drum cleaner to a transfer residual toner discharge hole discharging transfer residual toner from the drum cartridge, the toner cartridge comprising:

a toner chamber configured to accommodate toner having a toner discharge hole discharging toner from the toner cartridge; and a transfer residual toner chamber configured to accommodate transfer residual toner received through a transfer residual toner receiving hole receiving transfer residual toner from the drum cartridge, wherein the toner cartridge is movable between a first position and a second position, the toner cartridge being removable from the drum cartridge in a state the toner cartridge is located in the first position, the toner cartridge being unremovable from the drum cartridge in a state the toner cartridge is located in the second position, wherein in the state the toner cartridge is located in the second position, in a case the transfer residual toner discharge hole of the drum cartridge communicates with the transfer residual toner receiving hole of the toner cartridge, the toner cartridge is not movable from the second position to the first position, and in a case the transfer residual toner discharge hole does not communicate with the transfer residual toner receiving hole, the toner cartridge is movable from the second position to the first position, and wherein the drum cartridge further comprises:

a shutter movable between a shutter-closed position and a shutter-opened position, the shutter being configured to:

close the transfer residual toner discharge hole in a case the shutter is located in the shutter-closed position; and open the transfer residual toner discharge hole in a case the shutter is located in the shutter-opened position, wherein in the state the toner cartridge is located in the second position, in the case the shutter is located in the shutter-closed position, the transfer residual toner discharge hole does not communicate with the transfer residual toner receiving hole, and in the case the shutter is located in the shutter-opened position, the transfer residual toner discharge hole communicates with the transfer residual toner receiving hole, wherein the process cartridge further comprises a lock member movable between a lock position and a lock release position in the state the toner housing is located in the second position, the lock member being configured to:

lock the toner housing in the second position in a case the lock member is located in the lock position; and release a locked state of the toner housing in a case the lock member is located in the lock release position, wherein in a state the shutter is located in the shutter-closed position, the lock member is located in the lock release position, and wherein in a state the shutter is located in the shutter-opened position, the lock member is located in the lock position.

8. The process cartridge according to claim 7, wherein the drum cartridge comprises:

a first drum side plate configured to support a first end portion of the photosensitive drum in the axis direction;

a second drum side plate located distant from the first drum side plate in the axis direction and configured to support a second end portion of the photosensitive drum in the axis direction; and a pipe located between the first drum side plate and the second drum side plate in the axis direction and extending in the axis direction, a first end portion of the pipe in the axis direction connecting to the first drum side plate, a second end portion of the pipe in the axis direction connecting to the second drum side plate, and wherein the conveyor device is configured to convey transfer residual toner from the drum cleaner to the pipe, the pipe having the transfer residual toner discharge hole on a circumference surface of the pipe.

9. The process cartridge according to claim 8, wherein the transfer residual toner discharge hole is located at a central part of the pipe in the axis direction.

10. The process cartridge according to claim 8, wherein the shutter is movable along the circumference surface of the pipe, and wherein the shutter is integrally provided with the lock member.

11. The process cartridge according to claim 7, further comprising:

a developing device comprising:

a developing roller rotatable about a developing axis extending in the axis direction; and a developing housing configured to support the developing roller, wherein the developing device is located between the first drum side plate and the second drum side plate in the axis direction.

* * * * *